US008537775B2

(12) United States Patent
Olvera-Hernandez et al.

(10) Patent No.: US 8,537,775 B2
(45) Date of Patent: Sep. 17, 2013

(54) METHOD AND APPARATUS FOR MEDIA INDEPENDENT HANDOVER

(75) Inventors: Ulises Olvera-Hernandez, Kirkland (CA); Mahmoud Watfa, Montreal (CA); Shamim Akbar Rahman, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 930 days.

(21) Appl. No.: 12/049,228

(22) Filed: Mar. 14, 2008

(65) Prior Publication Data

US 2008/0259870 A1 Oct. 23, 2008

Related U.S. Application Data

(60) Provisional application No. 60/895,018, filed on Mar. 15, 2007.

(51) Int. Cl.
*H04W 4/00* (2009.01)

(52) U.S. Cl.
USPC .......................................... 370/331; 455/436

(58) Field of Classification Search
USPC ......... 370/331, 335, 342, 345–346; 709/224, 709/228; 455/433, 435.1, 436–439
See application file for complete search history.

(56) References Cited

U.S. PATENT DOCUMENTS

| | | | |
|---|---|---|---|
| 6,721,565 B1 | 4/2004 | Ejzak et al. | |
| 6,965,767 B2 | 11/2005 | Maggenti et al. | |
| 7,406,324 B1 * | 7/2008 | McConnell | 455/466 |
| 7,483,984 B1 | 1/2009 | Jonker et al. | |
| 7,792,081 B2 * | 9/2010 | Kim et al. | 370/331 |
| 8,036,177 B2 * | 10/2011 | Kim et al. | 370/331 |
| 8,233,450 B2 * | 7/2012 | Zaki et al. | 370/331 |
| 8,346,260 B2 * | 1/2013 | Kim et al. | 455/436 |
| 2003/0225912 A1 * | 12/2003 | Takeda et al. | 709/246 |
| 2004/0153547 A1 * | 8/2004 | Trossen | 709/228 |
| 2006/0229075 A1 * | 10/2006 | Kim et al. | 455/436 |
| 2006/0268782 A1 | 11/2006 | Kwak et al. | |

(Continued)

FOREIGN PATENT DOCUMENTS

| | | |
|---|---|---|
| RU | 2283542 | 9/2006 |
| WO | 2005/018200 | 2/2005 |

(Continued)

OTHER PUBLICATIONS

LAN MAN Standard Committee of the IEEE Computer Society, "Draft IEEE Standard for Local and Metropolitan Area Newtorks: Media Independent Handover Services", IEEE P802.21™ D03.00, (Dec. 2006).

(Continued)

*Primary Examiner* — Kevin Mew
(74) *Attorney, Agent, or Firm* — Volpe and Koenig, P.C.

(57) ABSTRACT

A method and apparatus for performing a handover are disclosed. An Internet protocol (IP) multimedia subsystem (IMS) client registers with an IMS network and establishes an MIH session with an MIH application server using an SIP. The IMS client establishes a session for IP-based service, (e.g., VoIP), with a communication peer using SIP messaging. MIH messages are exchanged for handover with the MIH application server over IP using SIP messages by encapsulating the MIH messages in SIP instant messages. Alternatively, the MIH messages may be exchanged with the MIH application over IP by sending equivalent SIP messages in place of the MIH messages.

26 Claims, 20 Drawing Sheets

(56) References Cited

U.S. PATENT DOCUMENTS

| | | | |
|---|---|---|---|
| 2006/0274697 A1* | 12/2006 | Kim et al. | 370/331 |
| 2006/0276192 A1* | 12/2006 | Dutta et al. | 455/436 |
| 2006/0277298 A1* | 12/2006 | Kim et al. | 709/224 |
| 2006/0291423 A1 | 12/2006 | Carlton | |
| 2007/0072605 A1* | 3/2007 | Poczo | 455/432.2 |
| 2007/0091846 A1 | 4/2007 | Kim et al. | |
| 2007/0110075 A1 | 5/2007 | Olvera-Hernandez | |
| 2007/0197214 A1* | 8/2007 | Faccin et al. | 455/433 |
| 2007/0280453 A1 | 12/2007 | Kelley et al. | |
| 2007/0291792 A1 | 12/2007 | Watfa et al. | |
| 2008/0062926 A1* | 3/2008 | Oba | 370/331 |
| 2008/0096558 A1* | 4/2008 | Liu et al. | 455/435.2 |
| 2009/0061776 A1 | 3/2009 | Takei et al. | |
| 2009/0271859 A1* | 10/2009 | Trossen | 726/12 |
| 2010/0048213 A1* | 2/2010 | Kim et al. | 455/436 |
| 2010/0131663 A1* | 5/2010 | Lee et al. | 709/228 |
| 2010/0150110 A1* | 6/2010 | Dutta et al. | 370/331 |
| 2010/0325292 A1* | 12/2010 | Takeda et al. | 709/228 |
| 2011/0092206 A1* | 4/2011 | Wong et al. | 455/435.1 |

FOREIGN PATENT DOCUMENTS

| | | |
|---|---|---|
| WO | 2005/065163 | 7/2005 |
| WO | 2006/076421 | 7/2006 |
| WO | 2006/125471 | 11/2006 |
| WO | 2007/015068 | 2/2007 |
| WO | 2007/019090 | 2/2007 |
| WO | 2007/113524 | 11/2007 |

OTHER PUBLICATIONS

Third Generation Partnership Project, "Technical Specification Group Core Network and Terminals; IP Multimedia Call Control Protocol based on Session Intiation Protocol (SIP) and Session Description Protocol (SDP); Stage 3 (Release 5)," 3GPP TS 24.229 V5.18.0 (Sep. 2006).

Third Generation Partnership Project, "Technical Specification Group Core Network and Terminals; IP Multimedia Call Control Protocol based on Session Intiation Protocol (SIP) and Session Description Protocol (SDP); Stage 3 (Release 7)," 3GPP TS 24.229 V7.60 (Dec. 2006).

Third Generation Partnership Project, "Technical Specification Group Core Network and Terminals; IP Multimedia Call Control Protocol based on Session Intiation Protocol (SIP) and Session Description Protocol (SDP); Stage 3 (Release 7)," 3GPP TS 24.229 V7.10.0 (Dec. 2007).

Third Generation Partnership Project, "Technical Specification Group Core Network and Terminals; IP Multimedia Call Control Protocol based on Session Intiation Protocol (SIP) and Session Description Protocol (SDP); Stage 3 (Release 8)," 3GPP TS 24.229 V8.2.0 (Dec. 2007).

Rahman et al., "Seamless Mobility for IMS using IEEE 802.21 and SIP," Wireless WIfI Convergence Confernece (Apr. 17-20, 2007).

Al Mosawi et al., "A Novel Micro Mobility Solution Based on Media Independent Handover and SIP," IEEE Vehicular Technology Conference, pp. 1-5, (Sep. 1, 2006).

Lan MAN Standard Committee of the IEEE Computer Society, "Draft IEEE Standard for Local and Metropolitan Area Networks: Media Independent Handover Services", IEEE P802.21™ /D03.00, (Sep. 2006).

Levin, " Suppression of Session Initiation Protocol (SIP) REFER Method Implicit Subscription", Network Working Group, Request for Comments: 4488, (May 2006).

Third Generation Partnership Project, "Technical Specification Group Core Network and Terminals; IP Multimedia Call control Protocol based on Session Intiation Protocol (SIP) and Session Description Protocol (SDP); Stage 3 (Release 6)," 3GPP TS 24.229 V6.17.0 (Dec. 2007).

Third Generation Partnership Project, "Technical Specification Group Core Network and Terminals; IP Multimedia Call control Protocol based on Session Intiation Protocol (SIP) and Session Description Protocol (SDP); Stage 3 (Release 5)," 3GPP TS 24.229 V5.18.0 (Sep. 2007).

Third Generation Partnership Project, "Technical Specification Group Core Network and Terminals; IP Multimedia Call control Protocol based on Session Intiation Protocol (SIP) and Session Description Protocol (SDP); Stage 3 (Release 5)," 3GPP TS 24.229 V5.21.0 (Dec. 2007).

Third Generation Partnership Project, "Technical Specification Group Core Network and Terminals; IP Multimedia Call control Protocol based on Session Intiation Protocol (SIP) and Session Description Protocol (SDP); Stage 3 (Release 6)," 3GPP TS 24.229 V6.13.0 (Dec. 2006).

Third Generation Partnership Project, "Technical Specification Group Core Network and Terminals; IP Multimedia Call Control Protocol based on Session Initiation Protocol (SIP) and Session Description Protocol (SDP); Stage 3 (Release 5)," 3GPP TS 24.229 V5.18.0 (Sep. 2007).

LAN MAN Standard Committee of the IEEE Computer Society, "Draft IEEE Standard for Local and Metropolitan Area Networks: Media Independent Handover Services", IEEE P802.21™ /D02.00, (Sep. 2006).

LAN MAN Standard Committee of the IEEE Computer Society, "Draft IEEE Standard for Local and Metropolitan Area Networks: Media Independent Handover Services", IEEE P802.21™ /D03.00, (Dec. 2006).

Levin, "Suppression of Session Initiation Protocol (SIP) Refer Method Implicit Subscription", Network Working Group, Request for Comments: 4488, (May 2006).

Rosenberg et al., "SIP: Session Initiation Protocol", Network Working Group, Request for Comments: 3261, (Jun, 2002).

Schoenwaelder, "Overview of the 2002 IAB Network Management Workshop", Network Working Group, Request for Comments: 3535, (May 2003).

Third Generation Partnership Project, "Technical Specification Group Core Network and Terminals; IP Multimedia Call Control Protocol based on Session Initiation Protocol (SIP) and Session Description Protocol (SDP); Stage 3 (Release 6)," 3GPP TS 24.229 V6.17.0 (Dec. 2007).

Third Generation Partnership Project, "Technical Specification Group Core Network and Terminals; IP Multimedia Call Control Protocol based on Session Initiation Protocol (SIP) and Session Description Protocol (SDP); Stage 3 (Release 5)," 3GPP TS 24.229 V5.18.0 (Sep. 2006).

Third Generation Partnership Project, "Technical Specification Group Core Network and Terminals; IP Multimedia Call Control Protocol based on Session Initiation Protocol (SIP) and Session Description Protocol (SDP); Stage 3 (Release 5)," 3GPP TS 24.229 V5.21.0 (Dec. 2007).

Third Generation Partnership Project, "Technical Specification Group Core Network and Terminals; IP Multimedia Call Control Protocol based on Session Initiation Protocol (SIP) and Session Description Protocol (SDP); Stage 3 (Release 6)," 3GPP TS 24.229 V6.13.0 (Dec. 2006).

Third Generation Partnership Project, "Technical Specification Group Core Network and Terminals; IP Multimedia Call Control Protocol based on Session Initiation Protocol (SIP) and Session Description Protocol (SDP); Stage 3 (Release 7)," 3GPP TS 24.229 V7.6.0 (Dec. 2006).

Third Generation Partnership Project, "Technical Specification Group Core Network and Terminals; IP Multimedia Call Control Protocol based on Session Initiation Protocol (SIP) and Session Description Protocol (SDP); Stage 3 (Release 7)," 3GPP TS 24.229 V7.10.0 (Dec. 2007).

Third Generation Partnership Project, "Technical Specification Group Core Network and Terminals; Ip Multimedia Call Control Protocol based on Session Initiation Protocol (SIP) and Session Description Protocol (SDP); Stage 3 (Release 8)," 3GPP TS 24.229 V8.2.0 (Dec. 2007).

Rosenberg et al., "Sip: Session Initiation Protocol", Network Working Group, Request for Comments: 3261, (Jun. 2002).

Al Mosawi et al., "A Novel Micro Mobility Solution Based on Media Independent Handover and SIP," IEEE Vehicular Technology Conference, pp. 1-5 (Sep. 1, 2006).

Campbell et al., "Session Initiation Protocol (SIP) Extension for Instant Messaging", Network Working Group, Request for Comments: 3428, (Dec. 2002).

Lan Man Standard Committee of the IEEE Computer Society, "Draft IEEE Standard for Local and Metropolitan Area Networks: Media Independent Handover Services", IEEE P802.21 ™/D02.00, (Sep. 2006).

Lan Man Standard Committee of the IEEE Computer Society, "Draft IEEE Standard for Local and Metropolitan Area Networks: Media Independent Handover Services", IEEE P802.21 ™/D03.00, (Dec. 2006).

Levin, " Suppression of Session Initiation Protocol (Sip) Refer Method Implicit Subscription", Network Working Group, Request for Comments: 448, (May 2006).

Rahman et al., "Seamless Mobility for IMS using IEEE 802.21 and SIP," Wireless WIFI Convergence Conference (Apr. 17-20, 2007).

* cited by examiner

500

502

INVITE sip:ieee802dot21@domain.com SIP / 2.0
Via: SIP/2.0/ UDP [ currentIPAddress ]; branch =z9hG4bKxyz
Route: <sip:[ 5555::pc:s:c:f ]:753 ;branch=8uetb
Route: <sip:orig@scscf1.home1.fr;1r>
To: MIH Server <sip:ieee802dot21@domain.com>
From: IMS Client A <sip:imsClientA@domain.com>;tag
Call - ID: someNumber@currentIPAddress.com
Cseq: 1 INVITE
Max - Forwards: 70
Contact: <sip:[ currentIPAddress ]: *port#*>
Content - Disposition: session
Content - Type: application/sdp
Content - Length: value v = 0
o = Bob ##### ##### IN IP4 ( or IP6 ) currentIPAddress
504 — s = *MIH Services MIHF ID*
c = IN IP4 ( or IP6 ) [ currentIPAddress ]

REFER sip:ieee802dot21@domain.com SIP / 2.0
Via : SIP/2.0/UDP [ newIPAddress ]
To : MIH Server <sip:ieee802dot21@domain.com>
From : IMS Client A <sip:imsClientA@domain.com>;tag
Call-ID : someNumber@currentIPAddress.com
Cseq : #### REFER
Max-Forwards : 70
Refer-To : <sip:imsClientB@example.com;method=INVITE; *Call-ID%*id_of_call_with_ClientB%>
Refer-Sub : false
Contact: <sip:[ currentIPAddress ]:port#>
Content-Disposition : session
Content-Type : application/sdp
Content-Length : *value*

606

604 v = 0
o = Bob ##### ##### IN IP4 ( IP6 ) NewIPAddress
s = *MIH Services MIHF ID*
c = IN IP4 ( or IP6 ) [ NewIPAddress ]

INVITE sip:imsClientB@example.com SIP/2.0
Via: SIP/2.0/UDP [ NewIPAddress ]; branch =z9hG4bKxyz
To: IMS Client B <sip:imsClientB@example.com>
From: IMS Client A <sip:imsClientA@domain.com>;tag
Call-ID callIDOfOngoingDataSession@currentIPAddress.com
Cseq: #### INVITE
Max-Forwards: 70
Contact: <sip:[ NewIPAddress ]: *port#*>
Content-Type: application/sdp
Content-Length: value v = 0
o = IMS Client A ##### ##### IN IP4 ( or IP6 ) NewIPAddress
c = IN IP4 ( or IP6 ) [ NewIPAddress ]

INVITE  *sip:ieee802dot21@domain.com* SIP/2.0
Via: SIP/2.0/UDP [ NewIPAddress ]; branch=z9hG4bKxyz
To: MIH Server <sip:ieee802dot21@domain.com>
From: IMS Client A <sip:imsClientA@domain.com>;tag
Call-ID: *someNumber@currentIPAddress.com*
Cseq: #### INVITE
Max-Forwards: 70
Contact: <sip:[ NewIPAddress ]: *port#*>
Content-Disposition: session
Content-Type: application/sdp
Content-Length: value

804 v = 0
o = IMS Client A ##### ##### IN IP4 ( or IP6) NewIPAddress
s = MIH Services MIHF ID
c = IN IP4 ( or IP6) [ NewIPAddress ]

FIG. 8

METHOD AND APPARATUS FOR MEDIA INDEPENDENT HANDOVER

CROSS REFERENCE TO RELATED APPLICATION

This application claims the benefit of U.S. provisional application No. 60/895,018 filed Mar. 15, 2007, which is incorporated by reference as if fully set forth.

FIELD OF INVENTION

The application is related to a media independent handover between wireless networks.

BACKGROUND

Internet protocol (IP) multimedia subsystem (IMS) is a standardized next generation networking (NGN) architecture for providing mobile and fixed multimedia services. IMS uses a session initiation protocol (SIP) and runs over IP. IMS can be used for many different services, (e.g., instant messaging, video streaming, voice over IP (VoIP), and any other IP-based services).

The goal of IMS is to provide all the services, current and future, that the Internet provides. One of the methods used to provide these services is through an IMS application server. The IMS application server is a network entity that hosts and executes one or more IP services. An application server is triggered to provide a service by a serving call session control function (S-CSCF) which is a central node in the IMS signaling plane.

The IEEE 802.21 standard defines mechanisms and procedures that aid in the execution and management of inter-system handovers. Under IEEE 802.21, three main services can be accessed by mobility management applications in order to aid in the management of handover operations and system discovery and selection. These services include an event service, an information service, and a command service. These services do not depend on each other and, as a result, may be delivered independently.

Currently, there are no interfaces or mechanisms that describe how IEEE 802.21 services may interact with existing mobility management and handover functionality already defined within the relevant third generation partnership project (3GPP) or similar wireless standards specifications. There are no procedures or functionality to integrate IEEE 802.21 services within 3GPP or other wireless standards unless existing mobility management mechanisms and handover procedures are modified. Therefore, an MIH application server that is capable of integrating MIH services in a 3GPP or other wireless standards based network is required.

SUMMARY

A method and apparatus for performing a handover are disclosed. An IMS client registers with an IMS network and establishes an MIH session with an MIH application server using an SIP. The IMS client establishes a session for IP-based service, (e.g., VoIP), with a communication peer using SIP messages. MIH messages are exchanged for handover with the MIH application server over IP using SIP protocol by encapsulating the MIH message in SIP instant message. Alternatively, the MIH messages may be exchanged with the MIH application over IP by sending equivalent SIP messages in place of the MIH messages. As another alternative, MIH messages could also be exchange with MIH application server over other transport protocols, such as User Datagram Protocol (UPD) or transmission control protocol (TCP).

After handover, the session is resumed. A S-CSCF triggers the MIH application server based on a string "MIH services" and a unique identifier included in an INVITE request. The IMS client may send a REFER request to the MIH application server after the handover to resume the session. Alternatively, the IMS client may send a RE-INVITE request to the MIH application server and the communication peer.

BRIEF DESCRIPTION OF THE DRAWINGS

A more detailed understanding may be had from the following description, given by way of example and to be understood in conjunction with the accompanying drawings wherein:

FIG. 5 is an example INVITE request message;

FIG. 6 is an example REFER request message;

FIG. 7 is an example RE-INVITE request message destined for an IMS client;

FIG. 8 is an example RE-INVITE request message destined for an MIH application server.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment.

It should be noted that embodiments will be explained with reference to VoIP services as an example and embodiments are applicable to any other services, (e.g., instant messaging, video streaming, or any other IP-based services), that involve setting up a session.

Figure 1:
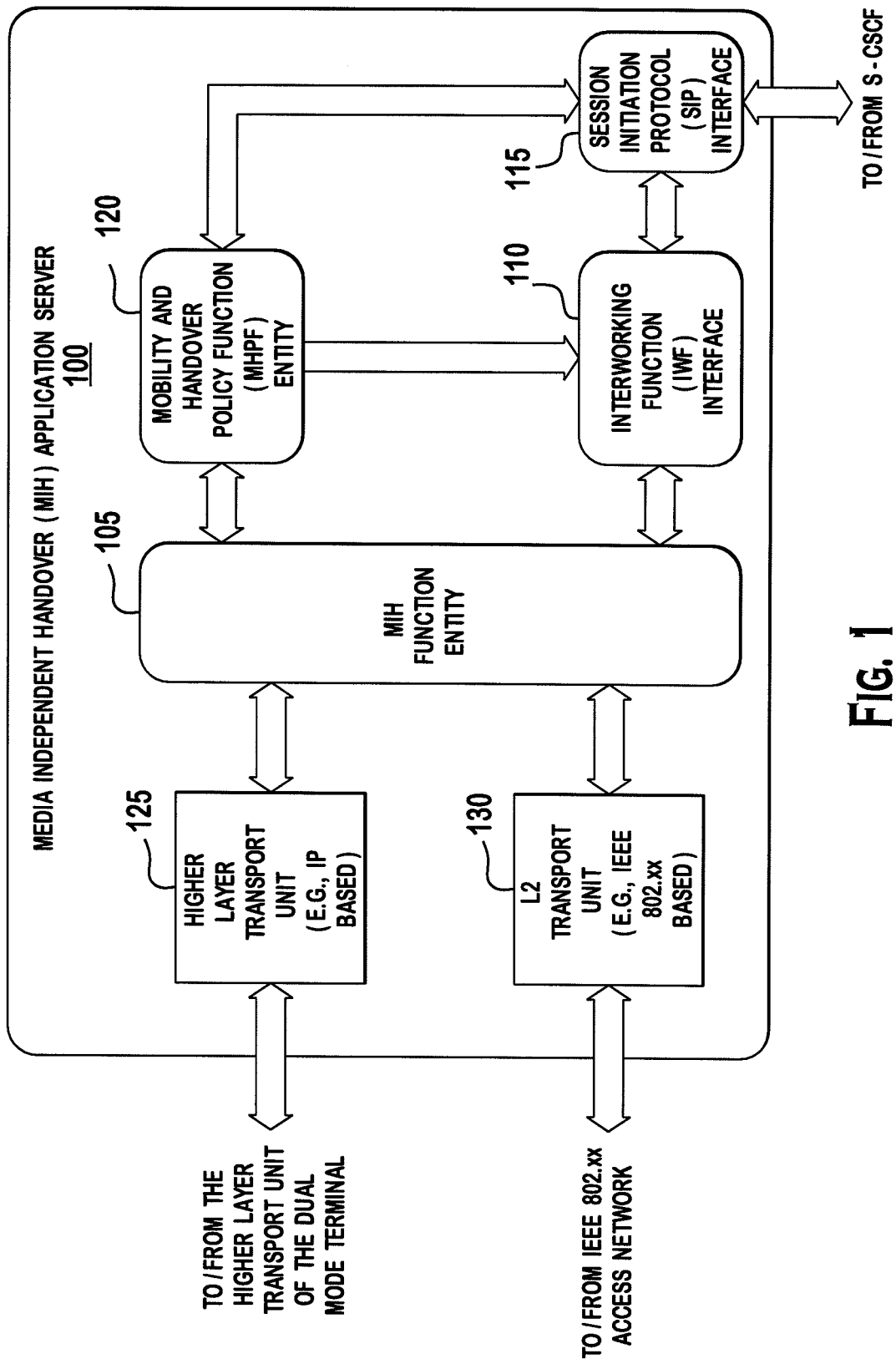
FIG. 1 is a block diagram of an MIH application server.
Figure 2A:
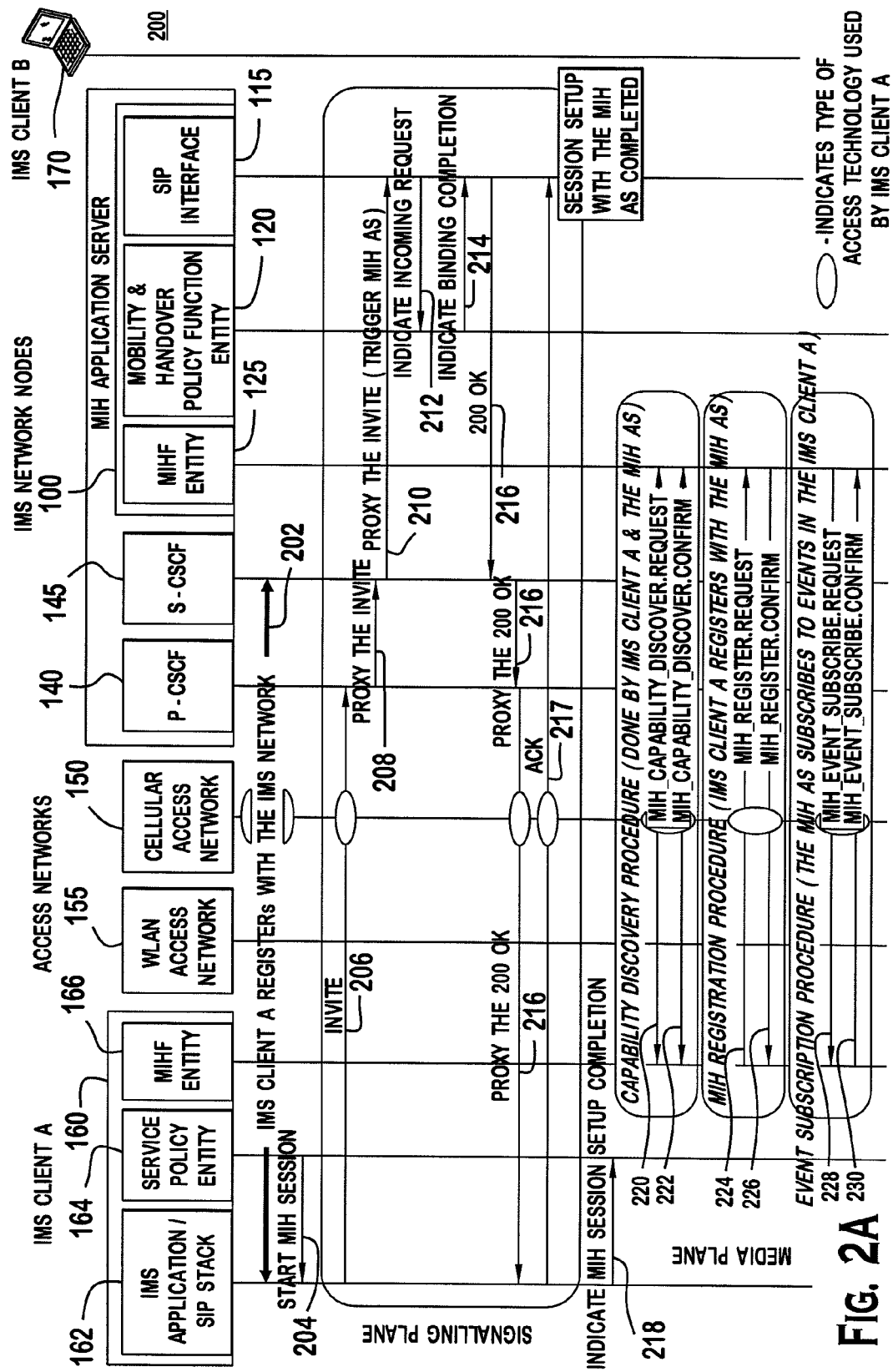
FIGS. 2A-2D are an example call flow in preparation for handover in accordance with one embodiment.
Figure 2B:
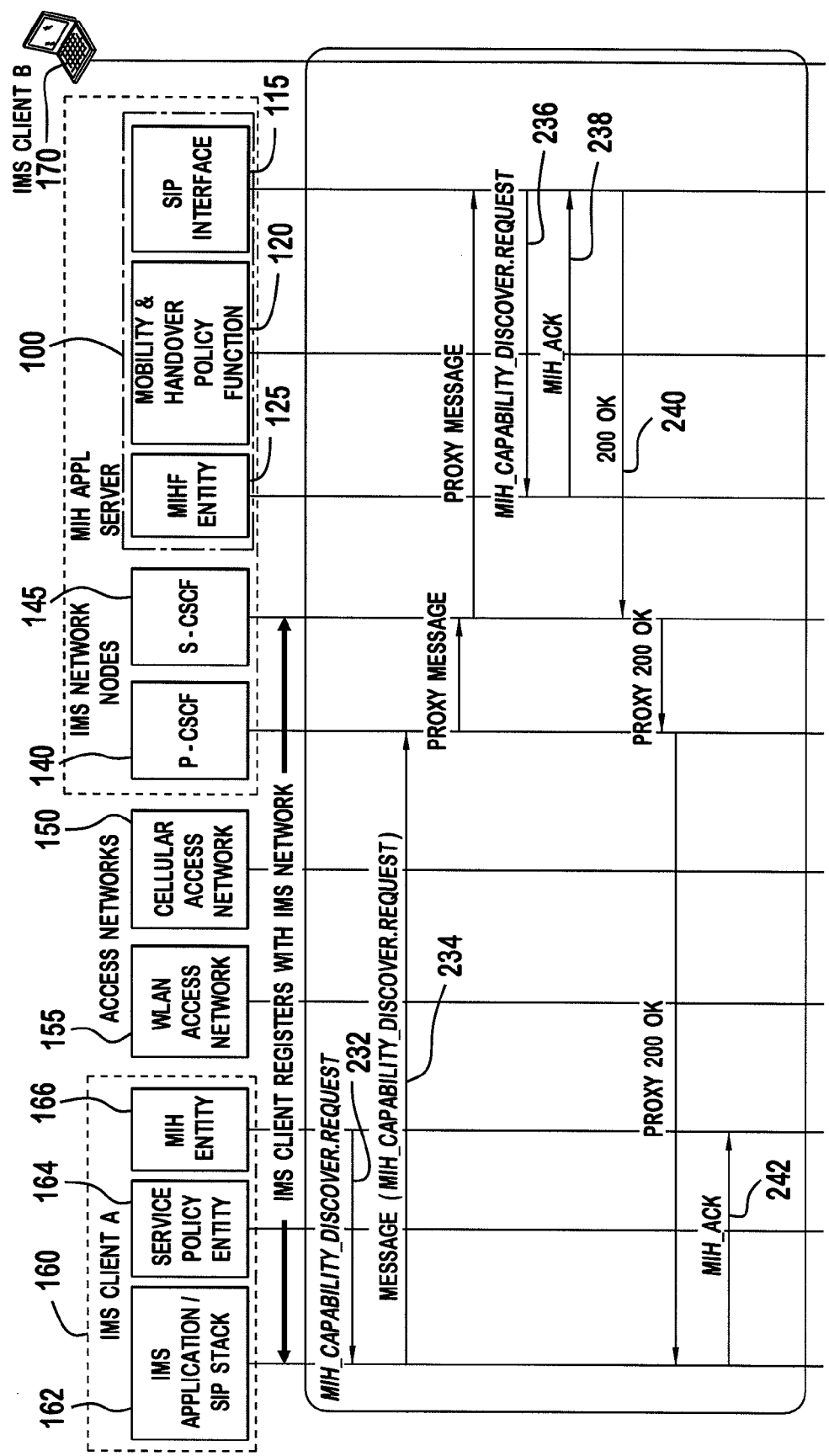
Figure 2C:
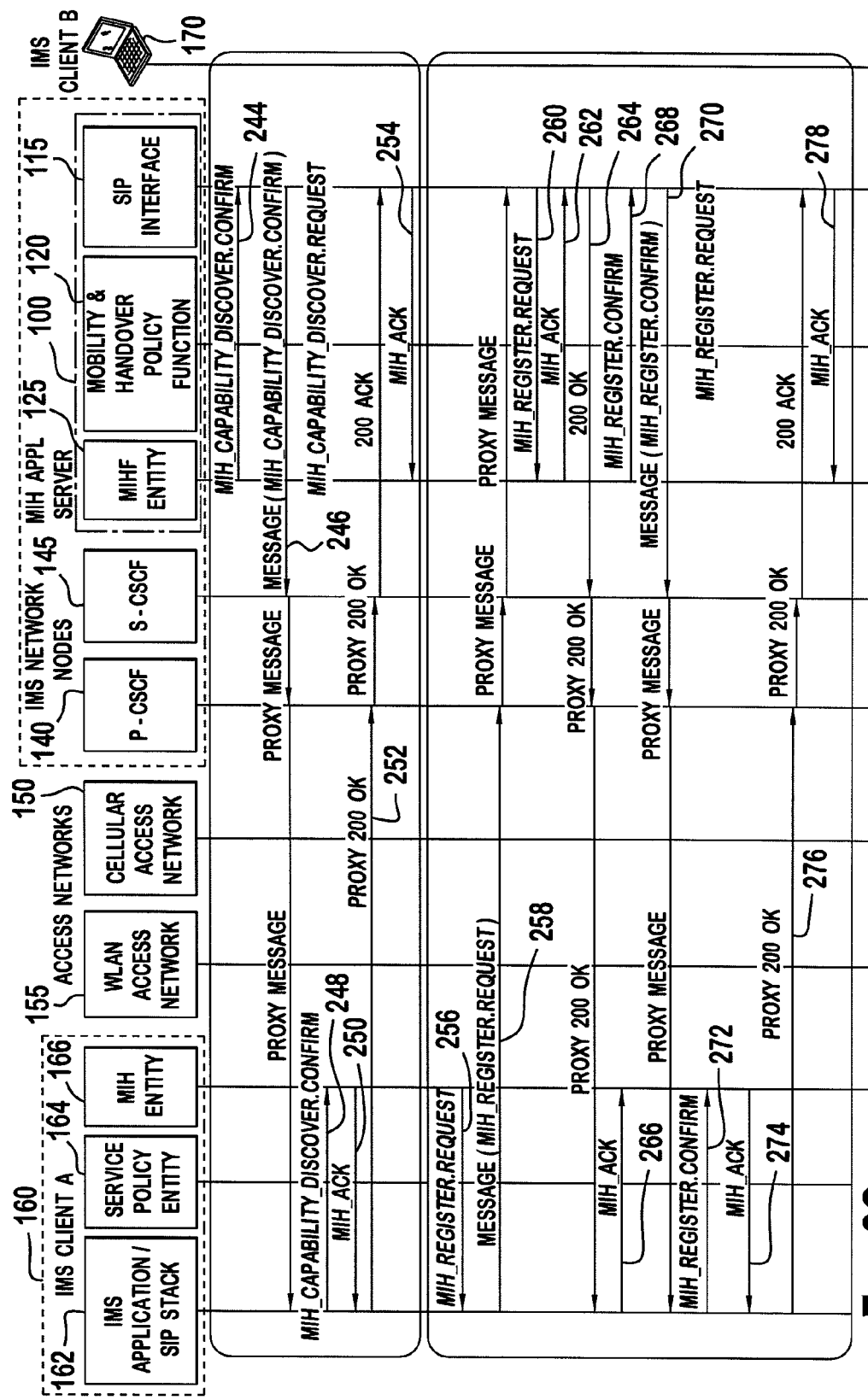
Figure 2D:
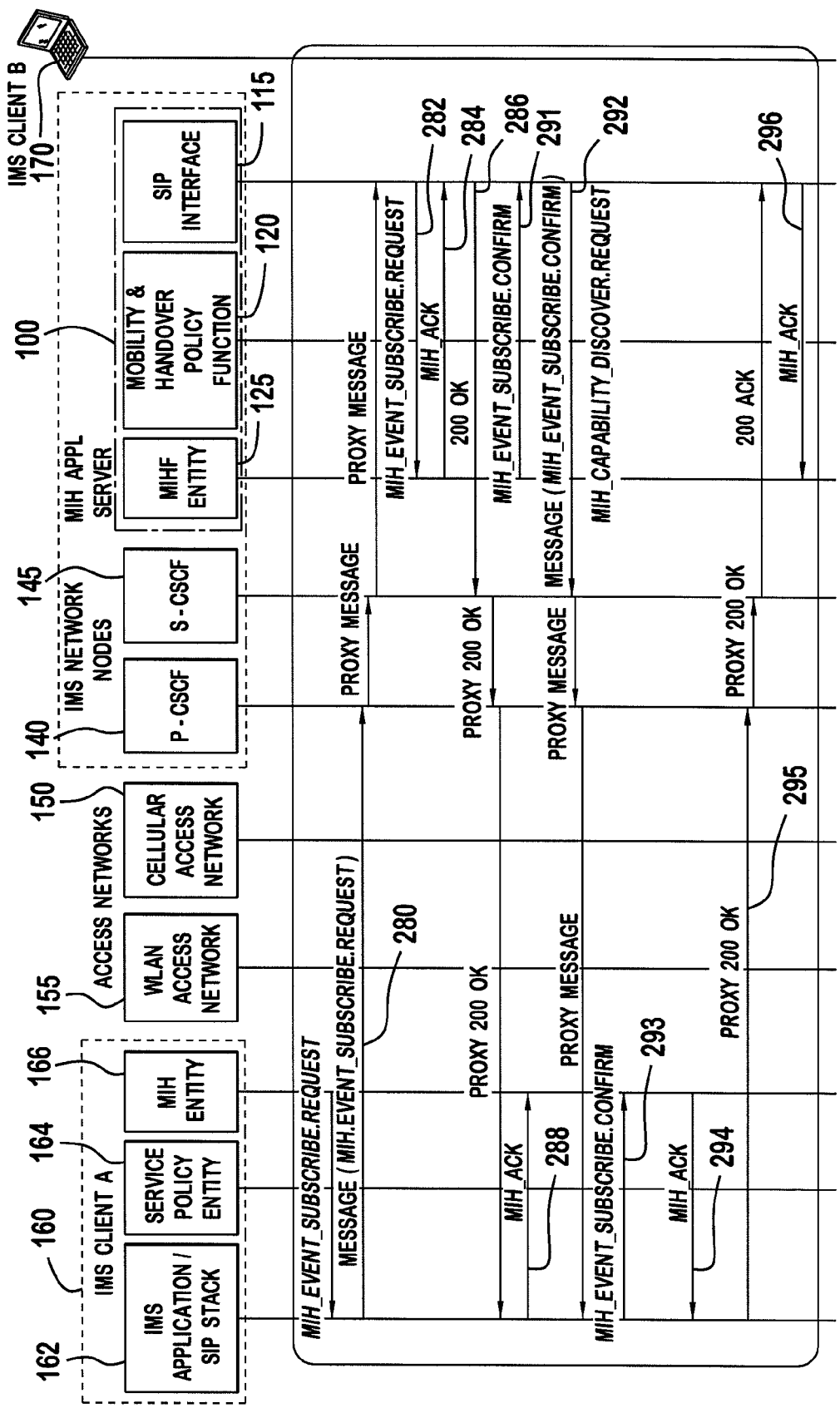

FIG. 1 is a block diagram of an MIH application server 100. The MIH application server 100 includes an MIH function (MIHF) entity 105, an interworking function (IWF) interface 110, an SIP interface 115, a mobility and handover policy function (MHPF) entity 120, a high layer transport unit (e.g., IP-based) 125, and an L2 transport unit (e.g., IEEE 802.xx-based) 130. The MIH application server 100 facilitates seamless integration of IP functions to and from an IMS client, (e.g., a WTRU), over any IMS capable network via the higher layer transport unit 125. The MIH application server 100 facilitates seamless integration of IEEE 802.xx functions to and from the IMS client via an 802.xx access network via the L2 transport unit 130. The MIH application server 100 also supports SIP signaling and interfaces with an S-CSCF in the IMS network via the SIP interface 115.

The MIHF entity 105 receives MIH messages, (i.e., MIH events and information), via the higher layer transport unit 125, (e.g., over IP), and/or the L2 transport unit 130, (e.g., the IEEE 802.xx). The MIHF entity 105 sends MIH message, (i.e., MIH events, information, and command), via the higher layer transport unit 125 or the L2 transport unit 130 in response to the MIH messages. The MIHF entity 105 may also output events signaling to the MHPF entity 120, (e.g., the change of the current state of the link layer technology supporting the session), or to the IWF interface 110, (e.g., indicating the successful completion of a handover).

The IWF interface 110 translates SIP messages received via the SIP interface 115 into MIH messages, and vice versa. The IWF interface 110 receives events from the MIHF entity 105, SIP signaling from the SIP interface 115 and commands from the MHPF entity 120 and translates them into either MIH or SIP signaling.

The MHPF entity 120 dynamically determines the specific behavior and mapping of SIP messages to MIH messages, and vice versa. The MHPF entity 120 controls handovers across heterogeneous networks. The MHPF entity 120 receives handover events and SIP signaling, and outputs handover commands and SIP call control signaling.

The SIP interface 115 receives commands from the MHPF entity 120 for session control purposes, and may also receive events from the MIHF entity 120 via the IWF interface 110. The SIP interface 115 outputs SIP signaling for call/session control purposes.

FIGS. 2A-2D are an example call flow 200 for handover in accordance with one embodiment. Hereinafter, it is assumed that an IMS client 160 is initially connected to a cellular access network 150 and performs a handover to a wireless local area network (WLAN) access network 155. It should be noted that the opposite scenario is also possible and the handover may be implemented between any types of wireless networks. The IMS client 160, (e.g., WTRU), registers with an IMS network, (i.e., S-CSCF 145), after discovery of a proxy call session control function (P-CSCF) 140 (202). A service policy entity 164 of the IMS client 160 initiates an MIH session (204). The SIP stack 162 of the IMS client 160 sends an INVITE request to the P-CSCF 140 (206). The P-CSCF 140 forwards the INVITE request to the S-CSCF 145 (208). The S-CSCF 145 downloads a profile of the IMS client 160 and triggers an MIH application server based on filter criteria (210), which will be explained in detail below.

The MIH application server 100 functions in an SIP user agent mode. The SIP interface 115 of the MIH application server 100 fetches a unique identifier and an IP address of the IMS client 160 included in the INVITE request and passes them to the MHPF entity 120 (212). The MHPF entity 120 creates a binding for the IMS client 160 and indicates a biding completion to the SIP interface 115 (214). The binding may include a unique identifier of the IMS client 160, (e.g., MIHF identity (ID)), a current IP address of the IMS client 160, and a registration state and registration timer associated with the registration state, which will be explained in detail below.

The SIP interface 115 transmits a 200 OK message to the IMS client 160 via the S-CSCF 145 and the P-CSCF 140 (216). The IMS client 160 sends an acknowledgement (ACK) to the MIH application server 100 (217). An MIH session is then established, and the IMS client 160 and the MIH application server 100 may exchange MIH messages directly over IP.

After MIH session completion is indicated to the service policy entity 164 at 218, the service policy entity 164 triggers the MIHF entity 166 to send remote MIH messages to the MIH application server 100. The MIHF entity 166 in the IMS client 160 may perform a capability discovery procedure with the MIHF entity 125 in the MIH application server 100 (220, 222). The MIHF entity 166 may also perform an MIH registration procedure for registering for specific services (224, 226). The MIHF entity 125 may perform an event subscription procedure with the MIHF entity 166 (228, 230). The MIH messages exchanged in 220-230 may be transmitted over IP, and may be transmitted using IPsec for secure transport. The MIHF entity 125 forwards the remote MIH messages received from the IMS client 160 to the MHPF entity 120. This causes state updates for the IMS client 160. The MHPF entity 120 also triggers the MIHF entity 125 to send remote MIH messages. The transportation of the MIH messages over IP may be performed as disclosed in commonly assigned U.S. Patent Application No. 60/801,786, filed May 19, 2006, which is incorporated by reference as if fully set forth.

In an alternate embodiment, the MIHF entity 166 in the IMS client 160 may perform a capability discovery procedure with the MIHF entity 125 in the MIH application server 100 according to 232-242. The MIH messages exchanged in 232-242 may be transmitted using the Session Initiation Protocol (SIP) as a transport protocol. The procedure begins when the MIH entity 166 sends a MIH_CAPABILITY_DISCOVERY-.REQUEST to the IMS Application/SIP Stack 162 (232). Then the MIH_CAPABILITY_DISCOVER.REQUEST message is transmitted through instant messaging techniques by transporting the message within the body of a MESSAGE SIP signal (234). The SIP Interface 115 then extracts the MIH_CAPABILITY_DISCOVER.REQUEST message and passes it on to the MIHF Entity 125 (236). The SIP Interface 115 may use the Content-Type Header within the MESSAGE SIP signal to determine that the MIH_CAPABILITY_DISCOVER.REQUEST messages needs to be delivered to the MIHF Entity. Upon receipt of the MIH_CAPABILITY_DISCOVER.REQUEST message, the MIHF entity 125 may generate an MIH Acknowledgement message (238). The successful receipt of the MESSAGE SIP signal at the MIH Application Server 100 generates a 200 OK SIP signal towards IMS Client 160. The 200 OK SIP signal may be used to transport the MIH Acknowledgement message, generated by the MIHF Entity 125 (240). Once the IMS Client 160 receives the 200 OK SIP signal, the IMS application/SIP Stack 162 sends an MIH_ACK message to the MIH Entity 166 (242).

Once the MIH_CAPABILITY_DISCOVER.REQUEST message is processed by the MIHF entity 125, a MIH_CAPABILITY_DISCOVER.CONFIRM message may be sent to convey the supported MIH capabilities requested in the MIH_CAPABILITY_DISCOVER.REQUEST message, in terms of Event Service, Command Service, and Information Service (244). The MIH_CAPABILITY_DISCOVER.CONFIRM message may be transmitted using the SIP as a transport protocol. In particular, MIH messages 244-254 may be transmitted through Instant Messaging techniques by transporting the MIH_CAPABILITY_DISCOVER.CONFIRM message within the body of a MESSAGE SIP signal (246). The IMS Application/SIP Stack 162, within the IMS Client A 160, extracts the MIH_CAPABILITY_DISCOVER.CONFIRM message and passes it on to the MIHF Entity 166 (248). The IMS Application/SIP Stack 162 may use the Content-Type Header within the MESSAGE SIP signal to determine that the MIH_CAPABILITY_DISCOVER.CONFIRM messages needs to be delivered to the MIHF Entity 166. Upon receipt of the MIH_CAPABILITY_DISCOVER.CONFIRM message, the MIHF entity 166 may generate an MIH Acknowledgement message (250). The successful receipt of the MESSAGE SIP signal at the IMS Client 160 generates a 200 OK SIP signal towards MIH Application Server 100 (252). The 200 OK SIP signal may be used to transport the MIH Acknowledgement message, generated by the SIP interface 115 (254).

The MIHF entity 166 may also perform an MIH registration procedure (256-278). The MIHF entity 166 in the IMS client 160 may perform a Registration procedure for registering for specific services with the MIHF entity 125 in the MIH application server 100 according to 256-266. The MIH messages exchanged in 256-266 may be transmitted using the Session Initiation Protocol (SIP) as a transport protocol. In particular, MIH messages 256-266 may be transmitted through instant messaging techniques by transporting the MIH_REGISTER.REQUEST message within the body of a MESSAGE SIP signal (258). The SIP Interface 115 extracts the MIH_REGISTER.REQUEST message and passes it on to the MIHF Entity 125 (260). The SIP Interface 115 may use the Content-Type Header within the MESSAGE SIP signal to determine that the MIH_REGISTER.REQUEST messages needs to be delivered to the MIHF Entity 125. Upon receipt of the MIH_REGISTER.REQUEST message, the MIHF entity 125 may generate an MIH Acknowledgement message (262). The successful receipt of the MESSAGE SIP signal at the MIH Application Server 100 generates a 200 OK SIP signal towards IMS Client 160. The 200 OK SIP signal may be used to transport the MIH Acknowledgement message, generated by the MIHF Entity 125 (264). Upon reception of the 200 OK SIP signal, the IMS Application/SIP Stack 162 send an acknowledgement to the MIH entity 166 (266)

Once the MIH_REGISTER.REQUEST message is processed by the MIHF entity 125, a MIH_REGISTER.CONFIRM message may be sent to convey the result of the registration procedure, requested in the MIH_REGISTER.REQUEST message (268). The MIH_REGISTER.CONFIRM message may be transmitted using the SIP as a transport protocol. In particular, MIH messages 270-278 may be transmitted through instant messaging techniques by transporting the MIH_REGISTER-.CONFIRM message within the body of a MESSAGE SIP signal (270). The IMS Application/SIP Stack 162, within the IMS Client A 160, extracts the MIH_REGISTER.CONFIRM message and passes it on to the MIHF Entity 166 (272). The IMS Application/SIP Stack 162 may use the Content-Type Header within the MESSAGE SIP signal to determine that the MIH_REGISTER.CONFIRM messages needs to be delivered to the MIHF Entity 166. Upon receipt of the MIH_REGISTER.CONFIRM message, the MIHF entity 166 may generate an MIH Acknowledgement message (274). The successful receipt of the MESSAGE SIP signal at the MIH Client 160 generates a 200 OK SIP signal towards MIH Application Server 100. The 200 OK SIP signal may be used to transport the MIH Acknowledgement message, generated by the MIHF Entity 166 (276). Upon receipt of the 200 OK SIP signal, the SIP interface 115 send an MIH_ACK to the MIH entity 125 (278).

The MIHF entity 125 may perform an event subscription procedure with the MIHF entity 166 (280-290). The MIHF entity 166 in the IMS client 160 may perform an Event Subscription procedure to subscribe an interest in one or more event types from the MIH Entity 125 in the MIH application server 100 according to 280-288. The MIH messages exchanged in 280-288 may be transmitted using the SIP as a transport protocol. In particular, MIH messages 280-288 may be transmitted through instant messaging techniques by transporting the MIH_EVENT_SUBSCRIBE.REQUEST message within the body of a MESSAGE SIP signal (280). The SIP Interface 115 extracts the MIH_EVENT_SUBSCRIBE.REQUEST message and passes it on to the MIHF Entity 125 (282). The SIP Interface 115 may use the Content-Type Header within the MESSAGE SIP signal to determine that the MIH_EVENT_SUBSCRIBE.REQUEST messages needs to be delivered to the MIHF Entity. Upon receipt of the MIH_EVENT_SUBSCRIBE.REQUEST message, the MIHF entity 125 may generate an MIH Acknowledgement message (284). The successful receipt of the MESSAGE SIP signal at the MIH Application Server 100 generates a 200 OK SIP signal towards IMS Client 160. The 200 OK SIP signal may be used to transport the MIH Acknowledgement message, generated by the MIHF Entity 125 (286). Upon receipt of the of the 200 OK message, the IMS Application/SIP Stack 162 sends an MIH_ACK to the MIH entity 166 (288)

Figure 3A:
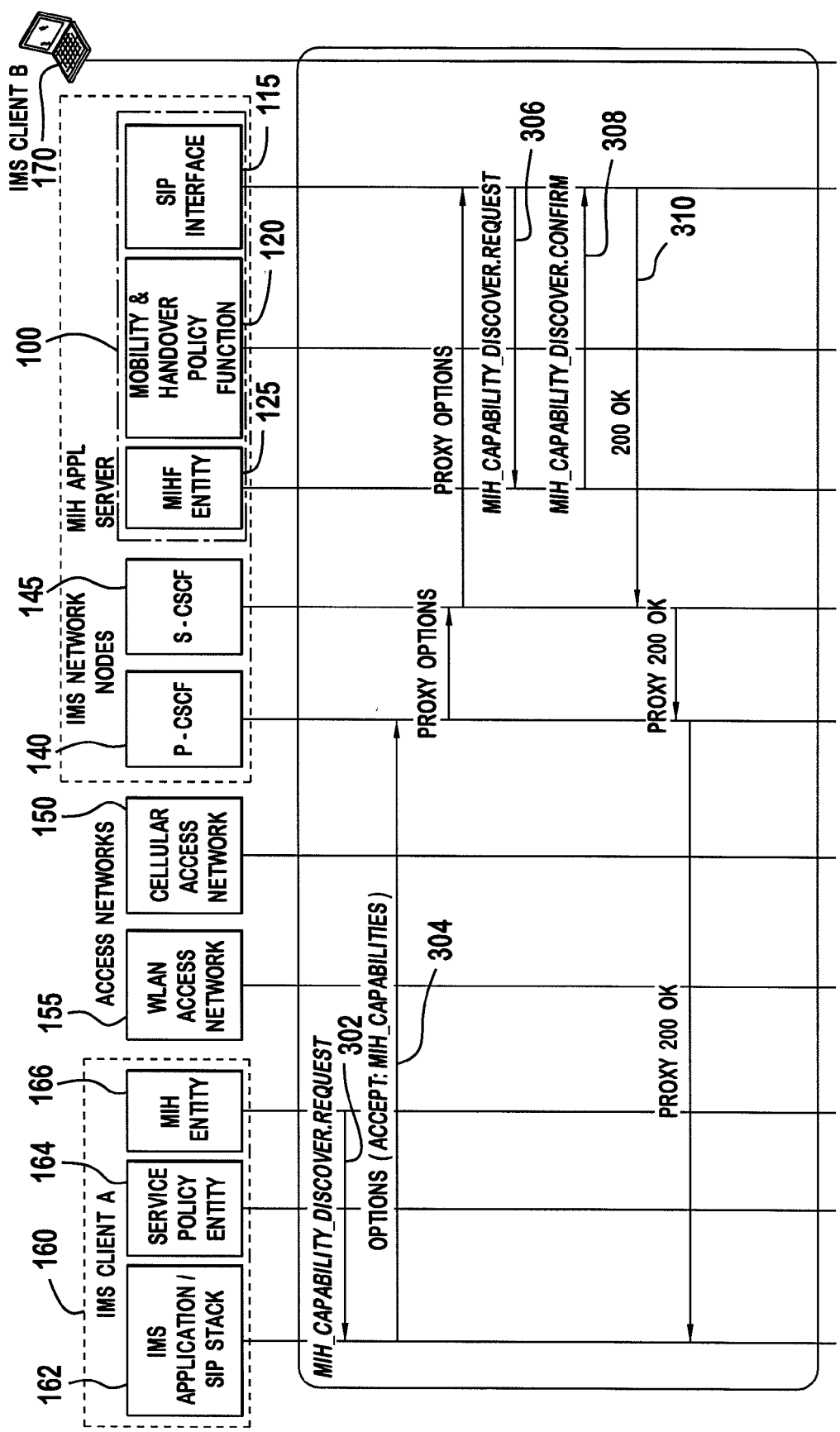
FIGS. 3A-3F are an example call flow for handover in accordance with another embodiment.
Figure 3B:
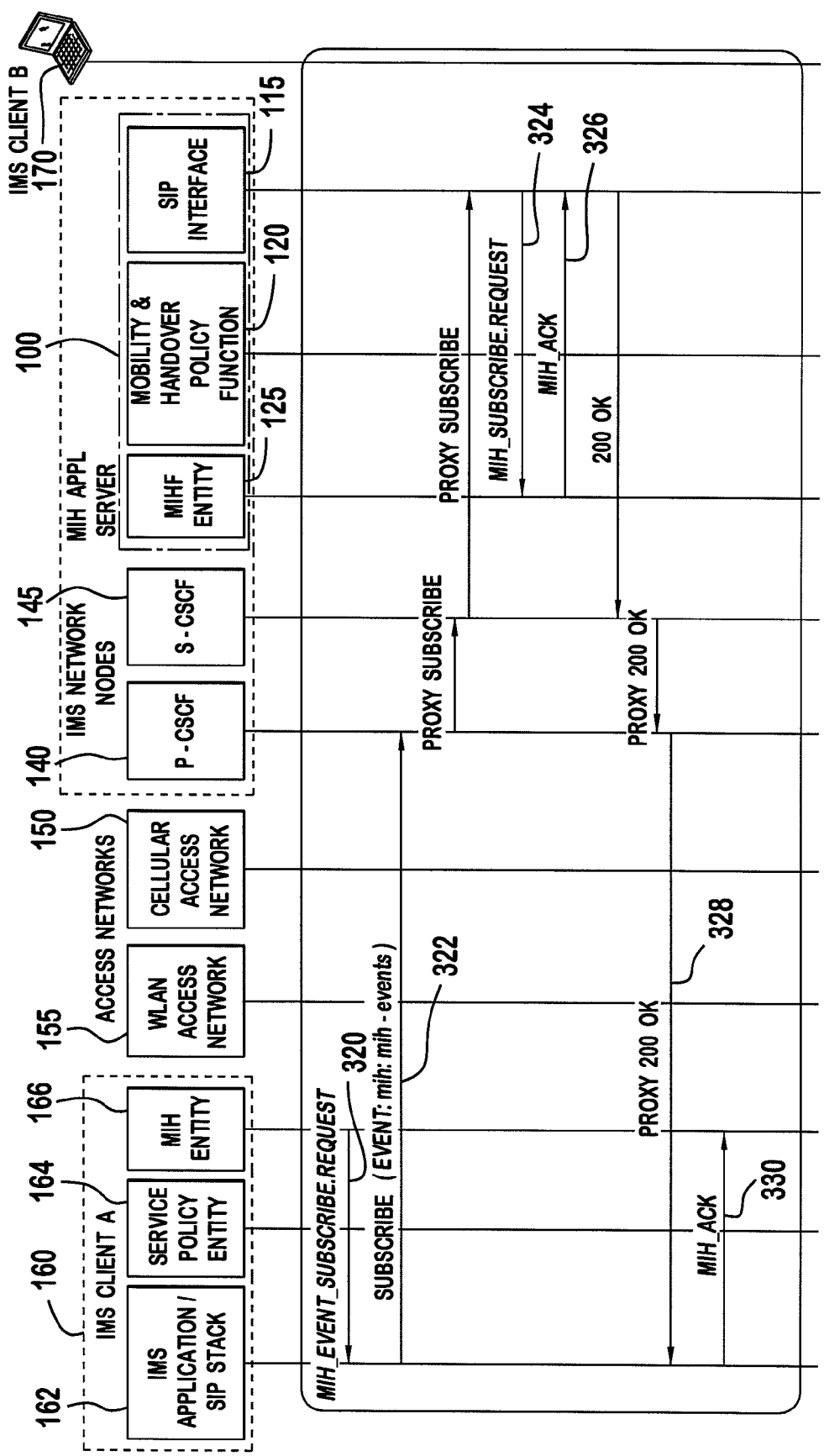
Figure 3C:
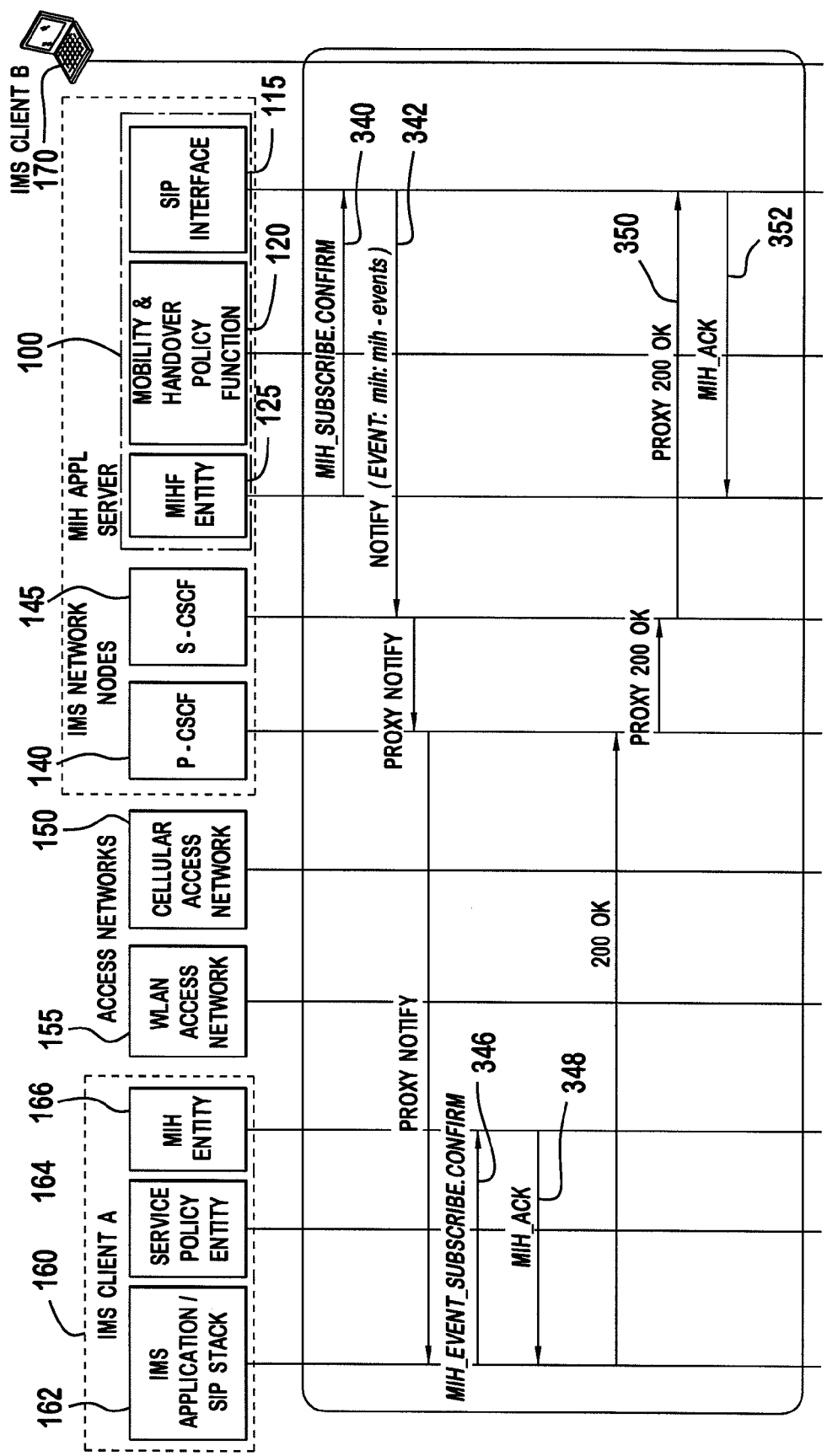
Figure 3D:
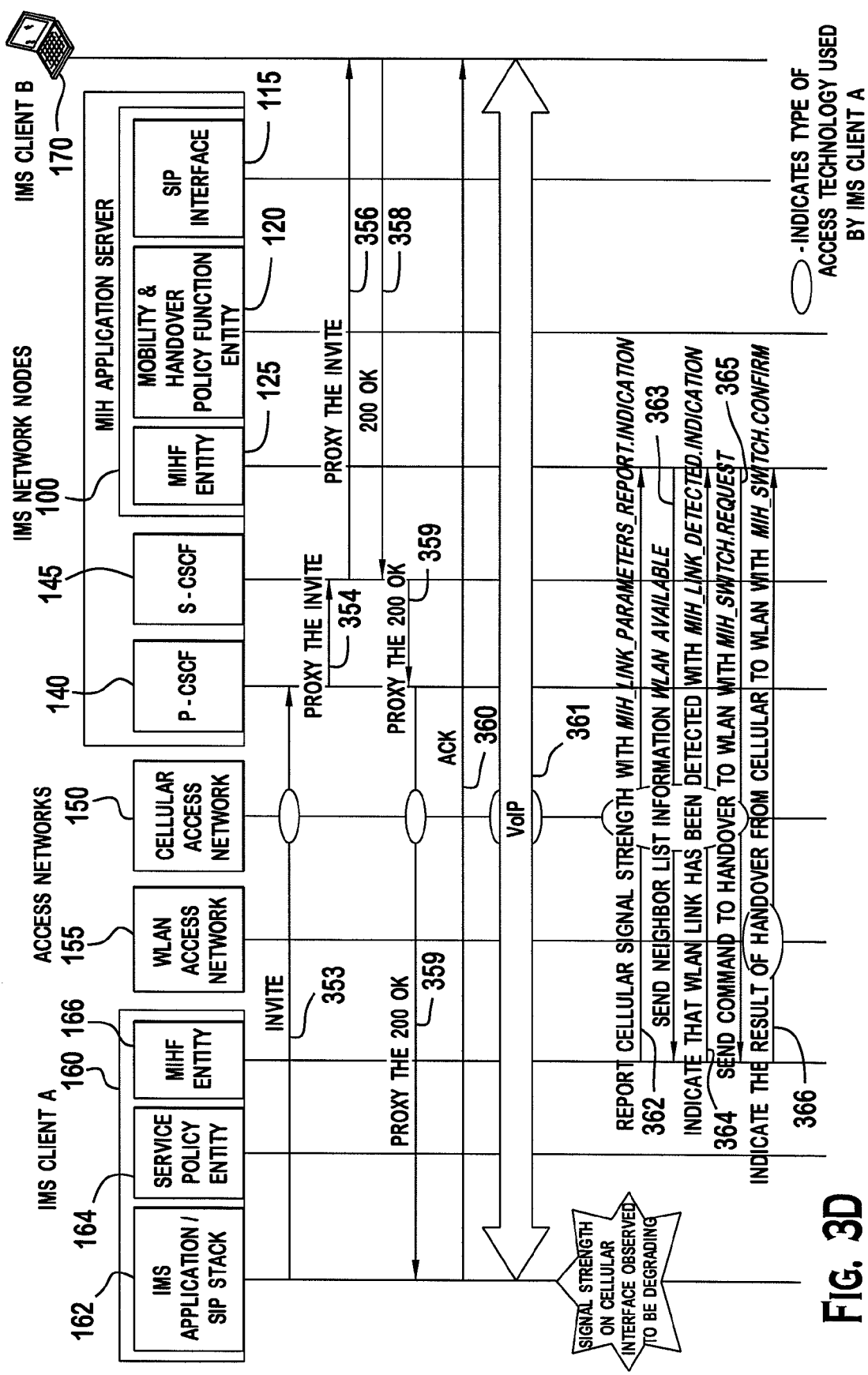
Figure 3E:
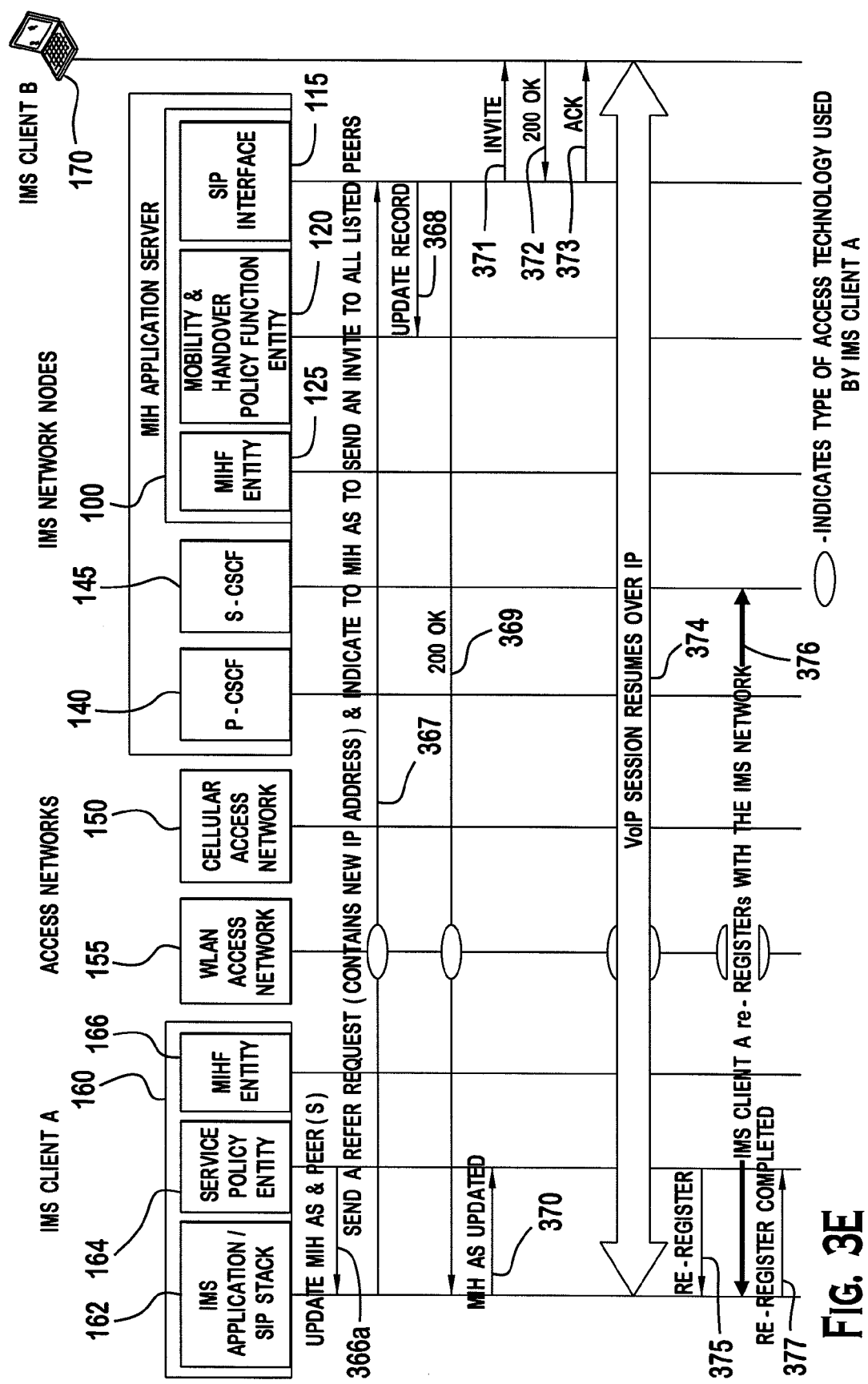
Figure 3F:
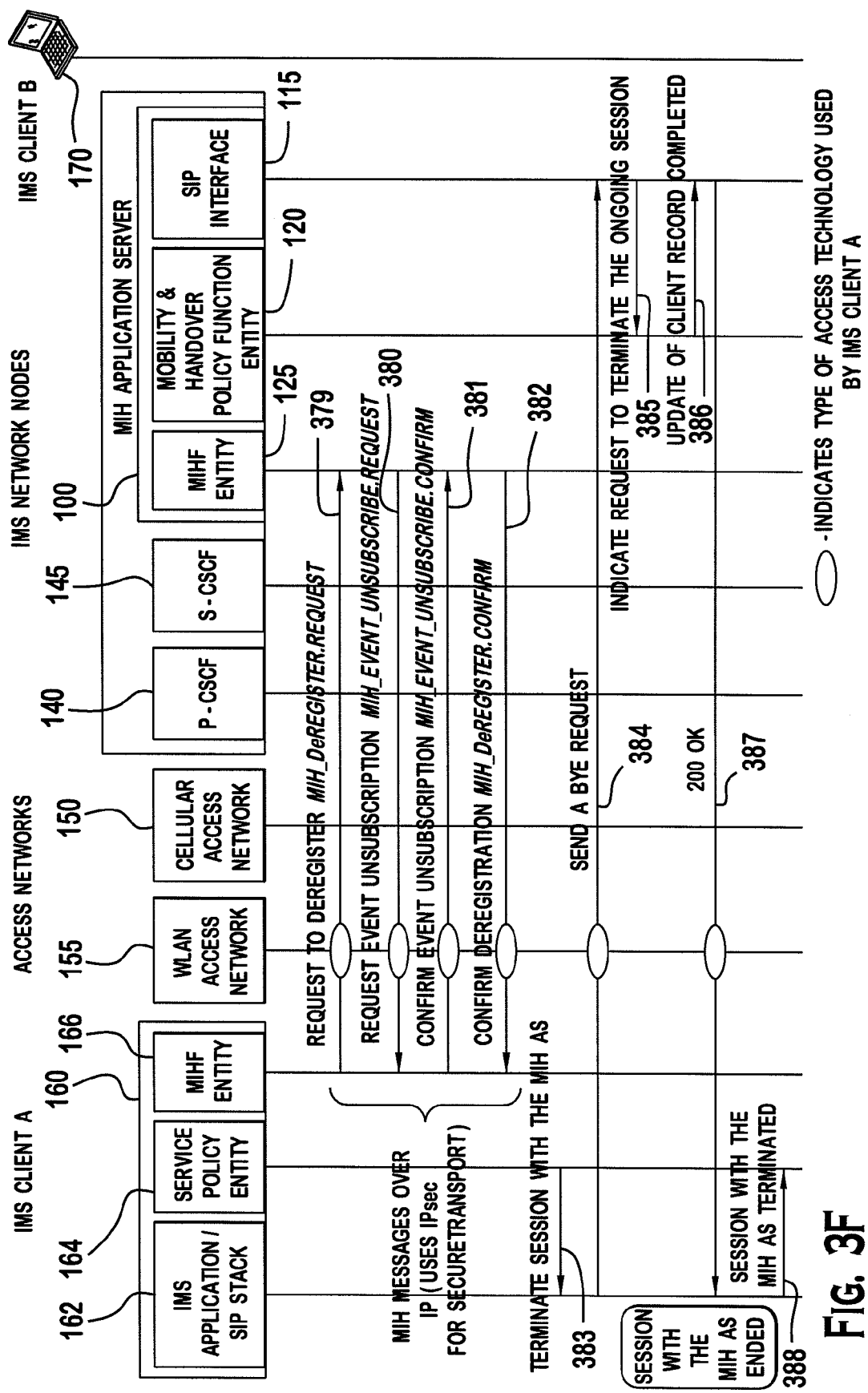
Figure 4A:
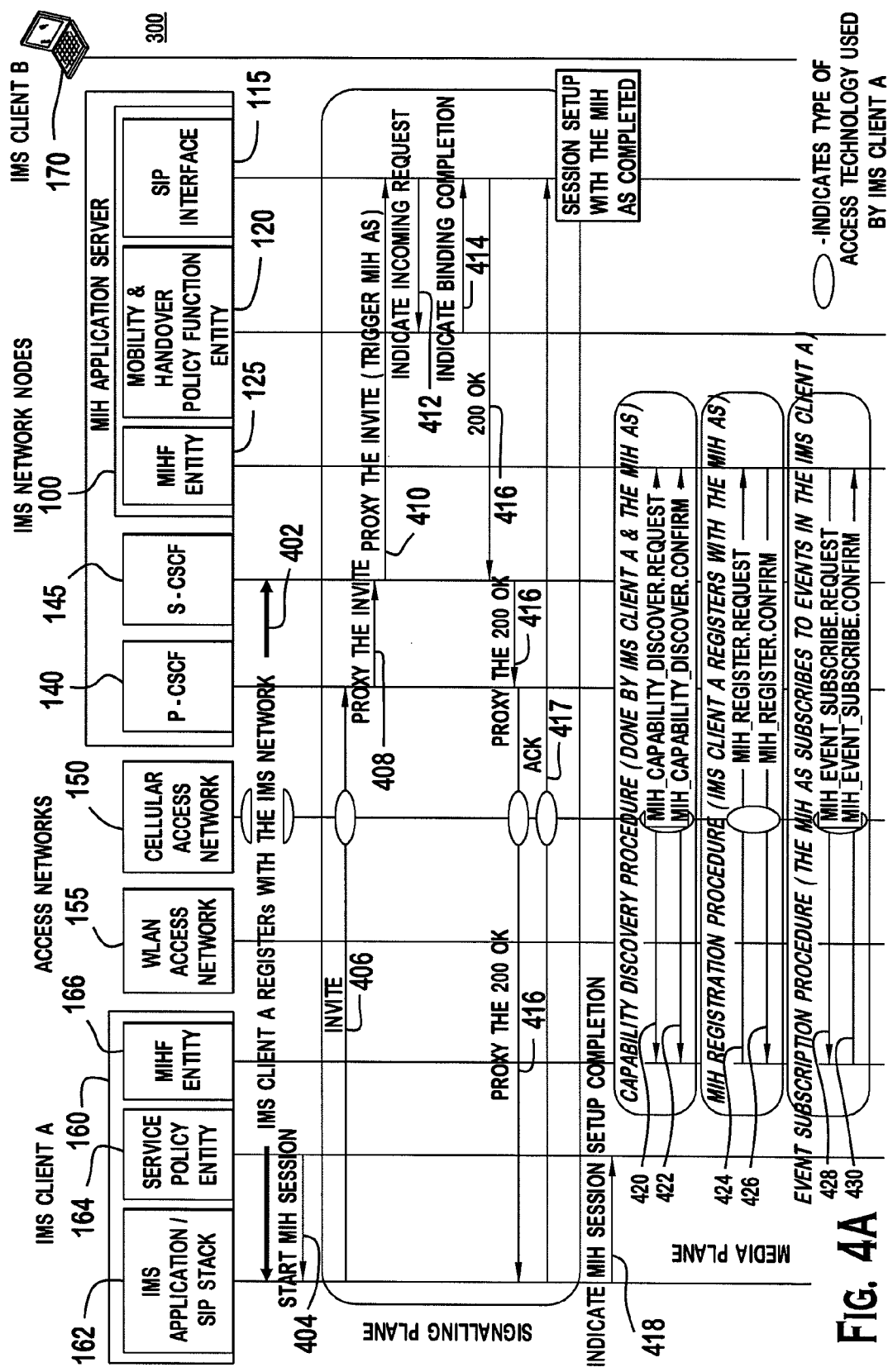
FIGS. 4A-4D are en example call flow for handover in accordance with another embodiment.
Figure 4B:
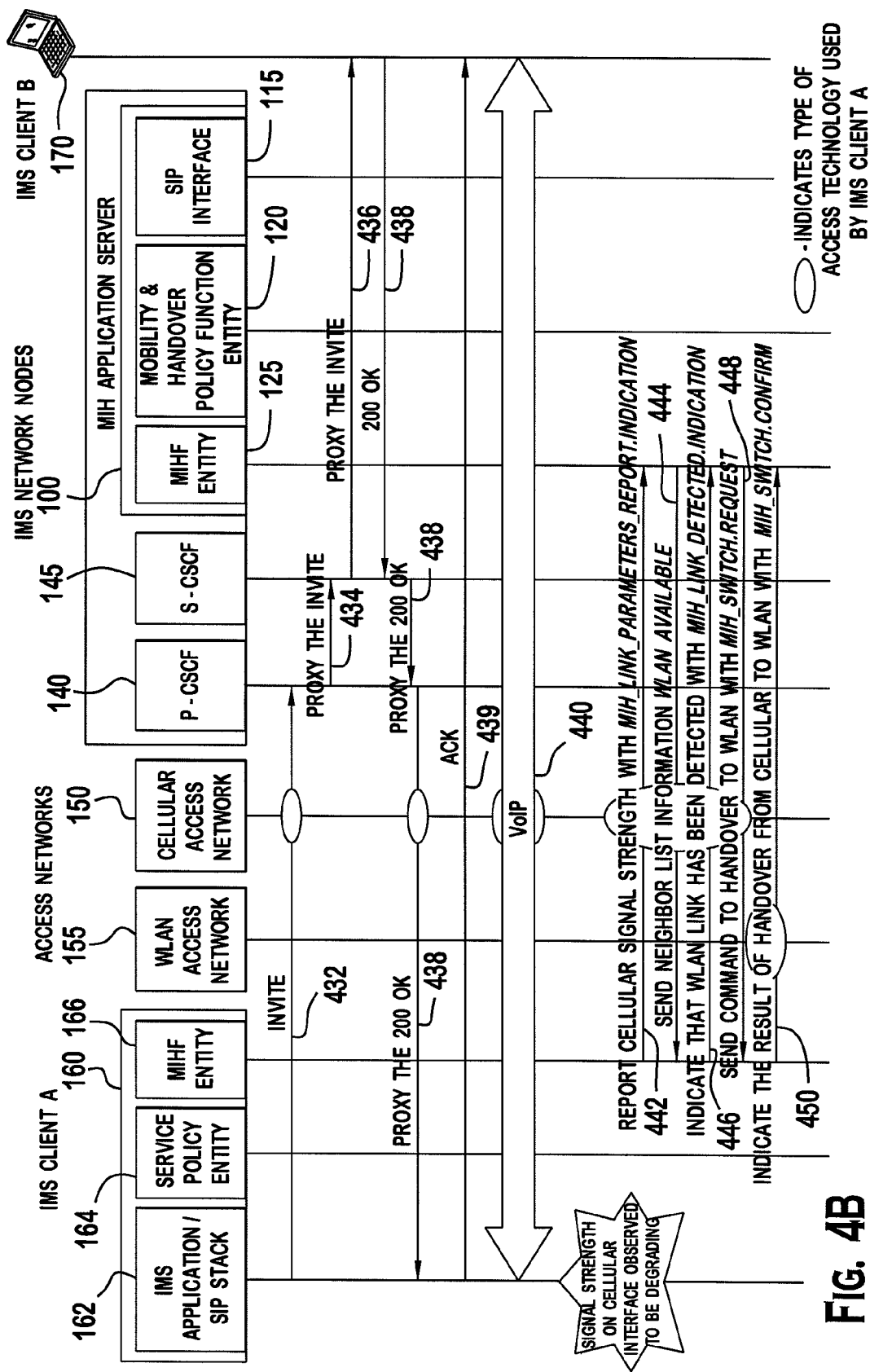
Figure 4C:
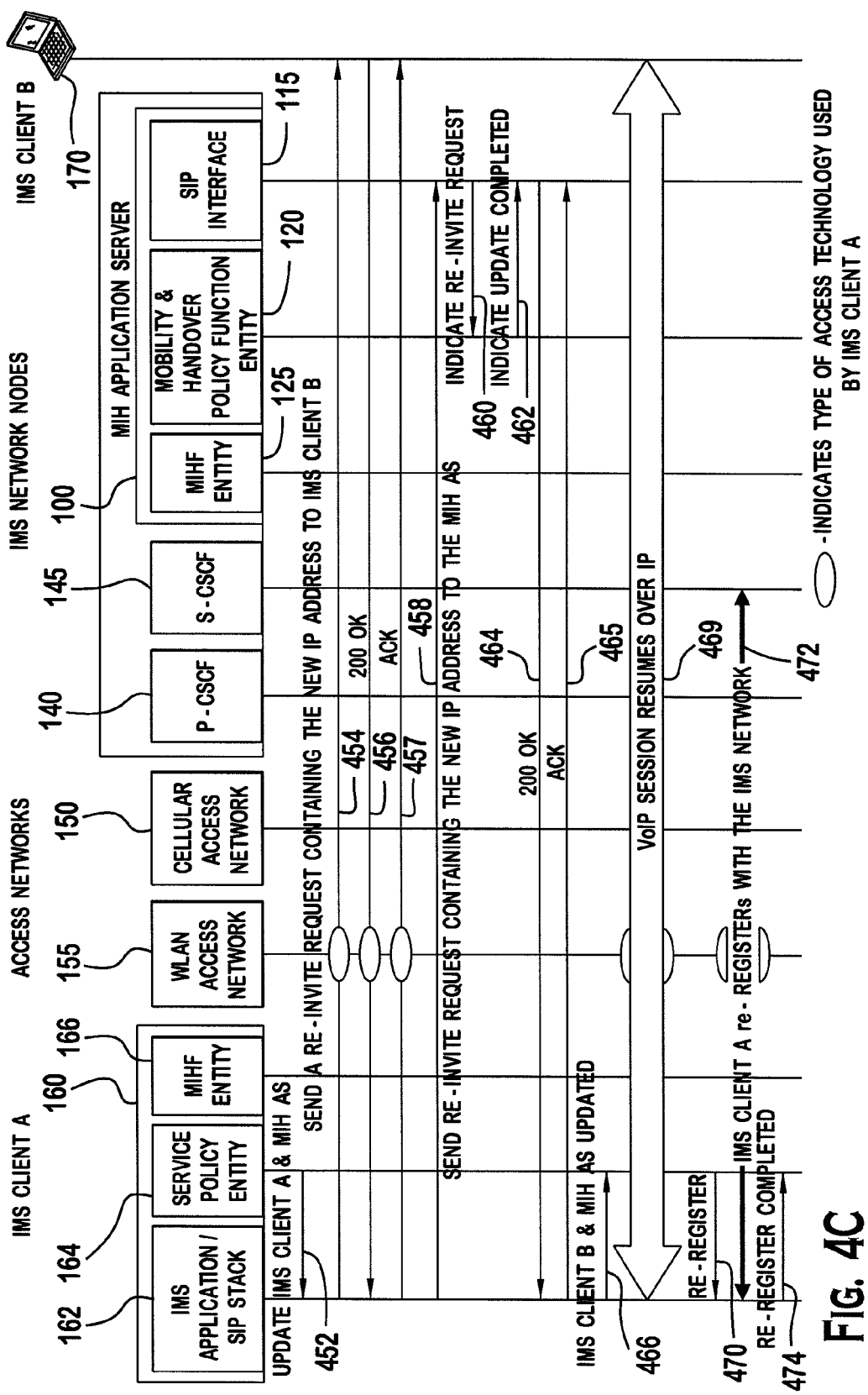
Figure 4D:
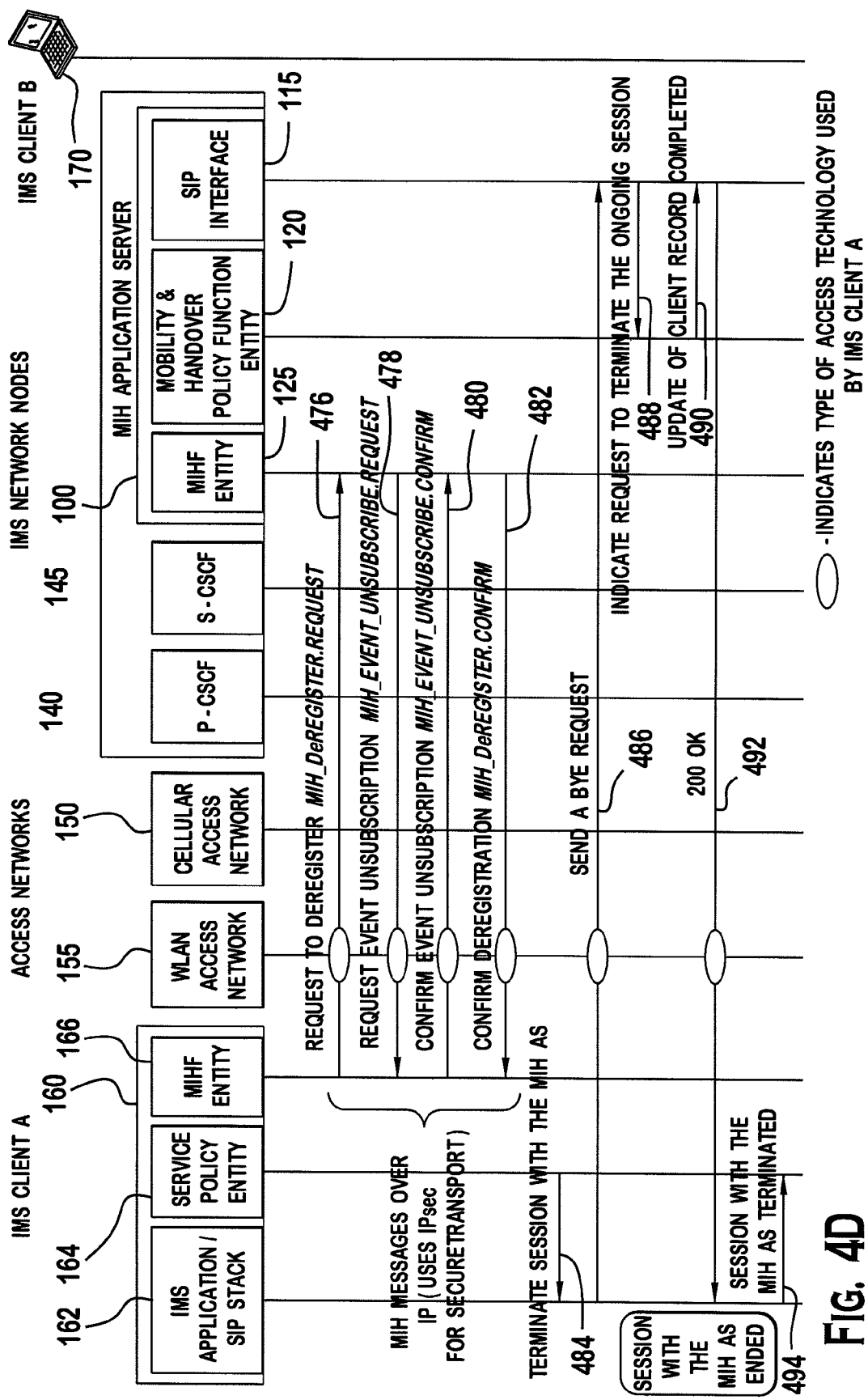

Once the MIH_EVENT_SUBSCRIBE.REQUEST message is processed by the MIHF entity 125, a MIH_EVENT_SUBSCRIBE.CONFIRM message may be sent to convey the subscription status of events, requested in the MIH_EVENT_SUBSCRIBE.REQUEST message (291). The MIH_REGISTER.CONFIRM message may be transmitted using the SIP as a transport protocol. In particular, MIH messages 291-296 may be transmitted through instant messaging techniques by transporting the MIH_EVENT_SUBSCRIBE.CONFIRM message within the body of a MESSAGE SIP signal (292). The IMS Application/SIP Stack 162, within the IMS Client A 160, extracts the MIH_EVENT_SUBSCRIBE.CONFIRM message and passes it on to the MIHF Entity 166 (293). The IMS Application/SIP Stack 162 may use the Content-Type Header within the MESSAGE SIP signal to determine that the MIH_EVENT_SUBSCRIBE.CONFIRM messages needs to be delivered to the MIHF Entity 166. Upon receipt of the MIH_EVENT_SUBSCRIBE.CONFIRM message, the MIHF entity 166 may generate an MIH Acknowledgement message (294). The successful receipt of the MESSAGE SIP signal at the MIH Client 160 generates a 200 OK SIP signal towards MIH Application Server 100. The 200 OK SIP signal may be used to transport the MIH Acknowledgement message, generated by the MIHF Entity 166 (295). Upon receipt of the 200 OK message, the SIP interface 115 sends an MIH_ACK to the MIH entity 125 (296). In order to complete the handover from this point, the procedure would resume at 353 in FIG. 3D.

FIG. 3A-3F is an example of call flow for handover according to another embodiment in which the MIHF entity 166 in the IMS client 160 may perform a capability discovery procedure with the MIHF entity 125 in the MIH application server 100. The procedure assumes that the registration procedure of FIG. 2A has already taken place. The MIH messages exchanged in 302-310 may be transmitted using the SIP as a transport protocol. In particular, MIH messages 302-310 may be transmitted by transporting the MIH_CAPABILITY_DISCOVER.REQUEST message within the message body of a OPTIONS SIP signal (304). The SIP Interface 115 extracts the MIH_CAPABILITY_DISCOVER.REQUEST message and passes it on to the MIHF Entity 125 (306). The SIP Interface 115 may use information within the "Accept" header field in the OPTIONS SIP signal to determine that the MIH_CAPABILITY_DISCOVER.REQUEST messages needs to be delivered to the MIHF Entity 125.

Once the MIH_CAPABILITY_DISCOVER.REQUEST message is processed by the MIHF entity 125, a MIH_CAPABILITY_DISCOVER.CONFIRM message may be sent to convey the supported MIH capabilities requested in the MIH_CAPABILITY_DISCOVER.REQUEST message, in terms of Event Service, Command Service and Information Service (308). The MIH_CAPABILITY_DISCOVER.CONFIRM message may be transmitted using the SIP as a transport protocol. In particular, MIH messages 308-310 may be transmitted by transporting the MIH_CAPABILITY_DISCOVER.CONFIRM message within the body of a 200 OK SIP signal used to report the successful delivery of the OPTIONS SIP signal. The SIP interface 115, within the MIH Application Server 100, extracts the MIH_CAPABILITY_DISCOVER.CONFIRM message and passes it on to the MIHF Entity 125 (310). The IMS Application/SIP Stack 162 may use the Content-Type Header within the 200 OK SIP signal to determine that the MIH_CAPABILITY_DISCOVER.CONFIRM messages needs to be delivered to the MIHF Entity 166.

In another alternate embodiment, the MIHF entity 125 may perform an event subscription procedure with the MIHF entity 166 (320-322). The MIHF entity 166 in the IMS client 160 may perform an Event Subscription procedure to subscribe an interest in one or more event types from the MIH Entity 125 in the MIH application server 100. The MIH messages exchanged in 320-322 may be transmitted using the SIP as a transport protocol. In particular, MIH messages 320-322 may be transmitted by transporting the MIH_EVENT_SUBSCRIBE.REQUEST message within the body of a SUBSCRIBE SIP signal as defined in IETF RFC 3265 (322). The SIP Interface 115 extracts the MIH_EVENT_SUBSCRIBE.REQUEST message and passes it on to the MIHF Entity 125 (324). The SIP Interface 115 may use the Event Header within the SUBSCRIBE SIP signal to determine that the MIH_EVENT_SUBSCRIBE.REQUEST messages needs to be delivered to the MIHF Entity. Upon receipt of the MIH_EVENT_SUBSCRIBE.REQUEST message, the MIHF entity 125 may generate an MIH Acknowledgement message (326). The successful receipt of the MESSAGE SIP signal at the MIH Application Server 100 generates a 200 OK SIP signal towards IMS Client 160. The 200 OK SIP signal may be used to transport the MIH Acknowledgement message, generated by the MIHF Entity 125 (328). Upon receipt of the 200 OK SIP message, the IMS Application/SIP Stack 162 may send an MIH_ACK message to the MIH entity 166.

Once the MIH_EVENT_SUBSCRIBE.REQUEST message is processed by the MIHF entity 125, a MIH_EVENT_SUBSCRIBE.CONFIRM message may be sent to convey the subscription status of events, requested in the MIH_EVENT_SUBSCRIBE.REQUEST message (340). The MIH_REGISTER.CONFIRM message may be transmitted using the SIP as a transport protocol. In particular, MIH messages 340-352 may be transmitted by transporting the MIH_EVENT_SUBSCRIBE.CONFIRM message within the body of a NOTIFY SIP signal (342). The IMS Application/SIP Stack 162, within the IMS Client A 160, extracts the MIH_EVENT_SUBSCRIBE.CONFIRM message and passes it on to the MIHF Entity 166 (344). The IMS Application/SIP Stack 162 may use the Content-Type Header within the NOTIFY SIP signal to determine that the MIH_EVENT_SUBSCRIBE.CONFIRM message needs to be delivered to the MIHF Entity 166. Upon receipt of the MIH_EVENT_SUBSCRIBE.CONFIRM message, the MIHF entity 166 may generate an MIH Acknowledgement message (348).

The IMS client 160 sends an INVITE request to an IMS client 170, (i.e., communication peer), to establish a VoIP session (353-359). It should be noted that VoIP is an example and any other service session may be established. If the IMS client 170 accepts the invitation, the IMS client 170 sends a 200 OK signal to the IMC client 160 (359). The IMS client 160 then sends an ACK to the IMS client 170 (360). A VoIP session between the IMS client 160 and the IMS client 170 is then established (361).

The IMS client 160 detects that a signal strength on the cellular interface is degrading. The MIHF entity 166 sends a signal strength report to the MIHF entity 125 of the MIH application server 100 (362). The MIHF entity 125 sends neighbor list information to the MIHF entity 166 (363). The service policy entity 164 turns on a WLAN interface of the IMS client 160 and detects a link based on the neighbor list information, and the MIHF entity 166 sends an indication that a WLAN link has been detected (364). The MIHF entity 125 sends a command to the MIHF entity 166 to perform a handover to the WLAN (365). The service policy entity 164 completes a handover to the WLAN and obtains a new IP address, (e.g., using a dynamic host configuration protocol (DHCP)), and the MIHF entity 166 indicates the result of handover from the cellular network to the WLAN to the MIHF entity 125 (366). The MIH messages exchanged in 362-366 may be transmitted over IP, and may be transmitted using IPsec for secure transport. The MIHF entity 125 forwards the remote MIH messages from the IMS client 160 to the MHPF entity 120.

The service policy entity 164 triggers update of the MIH application server 100 and the IMS client 170 (366a). The IMS client 160 sends a REFER request to the MIH application server 100 (367). The REFER request may be defined in either the SIP REFER method of RFC 3535, or the suppression of SIP REFER method implicit subscription, as in RFC 4488. The SIP interface 115 of the MIH application server 100 fetches the new IP address and unique identifier of the source in the REFER request, and send them to the MHPF entity 120, which updates the binding for the IMS client 160 (368). The MIH application server 100 sends a 200 OK signal to the IMS client 160. The SIP stack 162 indicates update of the MIH application server to the service policy entity 164 (369, 370).

The MIH application server 100 sends an INVITE request to the IMS client 170 as requested in the REFER request (371). The IMS client 170 sends a 200 OK signal to the MIH application server 100, and the MIH application server 100 sends an ACK to the IMS client 170 (372, 373). The VoIP session between the IMS client 160 and the IMS client 170 is resumed using a new IP address of the IMS client 160 (374). The IMS re-registration with the IMS network is then performed (375, 376, 377).

If necessary, the IMS client 160 may terminate the MIH session with the MIH application server 100 by sending a BYE request as defined by SIP. If the service policy entity 164 decides to terminate the MIH session with the MIH application server, the MIHF entity 166 sends a request to deregister to the MIHF entity 125 (379). The MIHF entity 125 sends a request for event unsubscription to the MIHF entity 166 (380). The MIHF entity 166 sends a confirm event unsubscription message to the MIHF entity 125 (381). The MIHF entity 125 sends a confirm deregistration message to the MIHF entity 166 (382). The MIH messages in 276-282 may be sent over IP, and may be sent using IPsec for secure transport. The MHPF entity 120 updates the registration record for the IMS client 160. The service policy entity 164 triggers termination of the MIH session with the MIH application server at 383, and a BYE request is sent to the MIH application server 100 at 384. It is indicated to the MHPF entity 120 to terminate the MIH session (385). The MHPF entity 120 indicates update completion of the IMS client record and a 200 OK signal is sent to the IMS client 160 (386, 387). The MIH session is then ended, and a termination of the MIH session is indicated to the service policy entity 164 (388).

FIGS. 4A-4D are an example call flow 400 for handover in accordance with another embodiment. Hereinafter, it is assumed that an IMS client 160 is initially connected to a cellular access network 150 and performs a handover to a wireless local area network (WLAN) access network 155. It should be noted that the opposite scenario is also possible and the handover may be implemented between any types of wireless networks. The IMS client 160, (e.g., WTRU), registers with an IMS network, (i.e., S-CSCF 145), after discovery of a proxy call session control function (P-CSCF) 140 (402). A service policy entity 164 of the IMS client 160 initiates an MIH session (404). The SIP stack 162 of the IMS client 160 sends an INVITE request to the P-CSCF 140 (406). The P-CSCF 140 forwards the INVITE request to the S-CSCF 145 (408). The S-CSCF 145 downloads a profile of the IMS client 160 and triggers an MIH application server based on filter criteria (410), which will be explained in detail below.

The MIH application server 100 functions in an SIP user agent mode. The SIP interface 115 of the MIH application server 100 fetches a unique identifier and an IP address of the IMS client 160 included in the INVITE request and passes them to the MHPF entity 120 (412). The MHPF entity 120 creates a binding for the IMS client 160 and indicates a biding completion to the SIP interface 115 (414). The binding may include a unique identifier of the IMS client 160, (e.g., MIHF ID), a current IP address of the IMS client 160, and a registration state and registration timer associated with the registration state, which will be explained in detail below.

The SIP interface 115 transmits a 200 OK message to the IMS client 160 via the S-CSCF 145 and the P-CSCF 140 (416). The IMS client 160 sends an ACK to the MIH application server 100 (417). An MIH session is then established, and the IMS client 160 and the MIH application server 100 may exchange MIH messages directly over IP.

After MIH session completion is indicated to the service policy entity 164 at 418, the service policy entity 164 triggers the MIHF entity 166 to send remote MIH messages to the MIH application server 100. The MIHF entity 166 in the IMS client 160 may perform a capability discovery procedure with the MIHF entity 125 in the MIH application server 100 (420, 422). The MIHF entity 166 may also perform an MIH registration procedure for registering for specific services (424, 426). The MIHF entity 125 may perform an event subscription procedure with the MIHF entity 166 (428, 430). The MIH messages exchanged in 420-430 may be transmitted over IP, and may be transmitted using IPsec for secure transport. The MIHF entity 125 forwards the remote MIH messages received from the IMS client 160 to the MHPF entity 120. This causes state updates for the IMS client 160. The MHPF entity 120 also triggers the MIHF entity 125 to send remote MIH messages. The transportation of the MIH messages over IP may be performed as defined in commonly assigned U.S. Patent Application No. 60/801,786, filed May 19, 2006.

The IMS client 160 sends an INVITE request to an IMS client 170, (i.e., communication peer), to establish a VoIP session (432-436). It should be noted that VoIP is an example and any other service session may be established. If the IMS client 170 accepts the invitation, the IMS client 170 sends a 200 OK signal to the IMC client 160 (438). The IMS client 160 then sends an ACK to the IMS client 170 (439). A VoIP session between the IMS client 160 and the IMS client 170 is then established (440).

The IMS client 160 detects that a signal strength on the cellular interface is degrading. The MIHF entity 166 sends a signal strength report to the MIHF entity 125 of the MIH application server 100 (442). The MIHF entity 125 sends neighbor list information to the MIHF entity 166 (444). The service policy entity 164 turns on a WLAN interface of the IMS client 160 and detects a link based on the neighbor list information, and the MIHF entity 166 sends an indication that a WLAN link has been detected (446). The MIHF entity 125 sends a command to the MIHF entity 166 to perform a handover to the WLAN (448). The service policy entity 164 completes a handover to the WLAN and obtains a new IP address, (e.g., using a DHCP), and the MIHF entity 166 indicates the result of handover from the cellular network to the WLAN to the MIHF entity 125 (450). The MIH messages exchanged in 442-450 may be transmitted over IP, and may be transmitted using IPsec for secure transport. The MIHF entity 125 forwards the remote MIH messages from the IMS client 160 to the MHPF entity 120.

The service policy entity 164 triggers update of the MIH application server 100 and the IMS client 170 (452). The IMS client 160 sends a RE-INVITE request to the IMS client 170 (454). The IMS client 160 indicates the new IP address and the call identifier related to the ongoing VoIP session. The IMS client 170 accepts the RE-INVITE request and sends a 200 OK message to the IMS client 160 (456). The IMS client 160 sends an ACK to the IMS client 170 (457).

The IMS client 160 then sends a RE-INVITE request to the MIH application server 100 (458). The SIP interface 115 of the MIH application server 100 fetches the new IP address and unique identifier of the source in the RE-INVITE request, and send them to the MHPF entity 120, which updates the binding for the IMS client 160 (460). The MHPF entity 120 indicates update complete to the SIP interface 115 (462). The MIH application server 100 sends a 200 OK signal to the IMS client 160 (464). The IMS client 160 sends an ACK to the MIH application server 100 (465). Updating completion of the IMA client 170 and the MIH application server 100 is indicated to the service policy entity 164 at 466 and the VoIP session between the IMS client 160 and the IMS client 170 is resumed using the new IP address of the IMS client 160 (468). The IMS re-registration with the IMS network is then performed (470, 472, 474).

If necessary, the IMS client 160 may terminate the MIH session with the MIH application server 100 by sending a BYE request as defined by SIP. If the service policy entity 164 decides to terminate the MIH session with the MIH application server, the MIHF entity 166 sends a request to deregister to the MIHF entity 125 (476). The MIHF entity 125 sends a request for event unsubscription to the MIHF entity 166 (478). The MIHF entity 166 sends a confirm event unsubscription message to the MIHF entity 125 (480). The MIHF entity 125 sends a confirm deregistration message to the MIHF entity 166 (382). The MIH messages in 376-382 may be sent over IP, and may be sent using IPsec for secure transport. The MHPF entity 120 updates the registration record for the IMS client 160. The service policy entity 164 triggers termination of the MIH session with the MIH application server at 484, and a BYE request is sent to the MIH application server 100 at 486. It is indicated to the MHPF entity 120 to terminate the MIH session (288). The MHPF entity 120 indicates update completion of the IMS client record and a 200 OK signal is sent to the IMS client 160 (490, 492). The MIH session is ended and a termination of the MIH session is indicated to the service policy entity 164 (494).

The S-CSCF 145 triggers the MIH application server after receiving the INVITE request from the IMS client 160. The INVITE request message body is constructed using a session description protocol (SDP). Multipurpose Internet mail extensions (MIME) encoding may be used for the message body. In an 's' header of the INVITE request message, a constant string "MIH Services" and a unique identifier of the IMS client 160 may be included. The unique identifier may be an MIHF ID.

The S-CSCF triggers the MIH application server based on the request method, an SIP uniform resource identifier (URI) of destination, and an existence of the specific string, (i.e., the constant string "MIH Services" and the unique identifier), in the INVITE request message body. The request method refers to whether the request is an INVITE request message or a REFER request message. The SIP URI refers to the URI for the MIH application service in this case. For example, the URI may be ieee802.21@domain.com.

FIG. 5 is an example INVITE request message 500. The message 500 includes an example MIH application server public URI 502 and an s header 504 including the string "MIH Services" and a unique ID of the IMS client, (e.g., MIHF ID).

FIG. 6 is an example REFER request message 600. The message 600 includes an example MIH application server public URI 602 and an s header 604 including the string "MIH Services" and a unique ID of the IMS client, (e.g., MIHF ID). The message 600 also includes call ID 606 of the ongoing data session with the other IMS client 170. The MIH application server 100 uses this when construction the INVITE request to the IMS client 170.

FIG. 7 is an example RE-INVITE request message 700 destined for an IMS client 170.

FIG. 8 is an example RE-INVITE request message 800 destined for an MIH application server 100. The message 800 includes an example MIH application server public URI 802 and an s header 804 including the string "MIH Services" and a unique ID of the IMS client, (e.g., MIHF ID).

The MIH application server 100, (i.e., the MHPF entity 120), creates a binding for an IMS client 160. The binding includes a unique identifier of the IMS client, (e.g., MIHF ID), a current IP address of the IMS client, and a registration state of the IMS client and a registration timer associated to the registration state. Five registration states are defined, (unregistered, pending MIH registration, MIH registered and active, MIH registered and inactive, and pending MIH deregistration), and the registration state changes if the corresponding timer expires, or if a specific MIH/SIP message is received instructing it to change.

Figure 9:
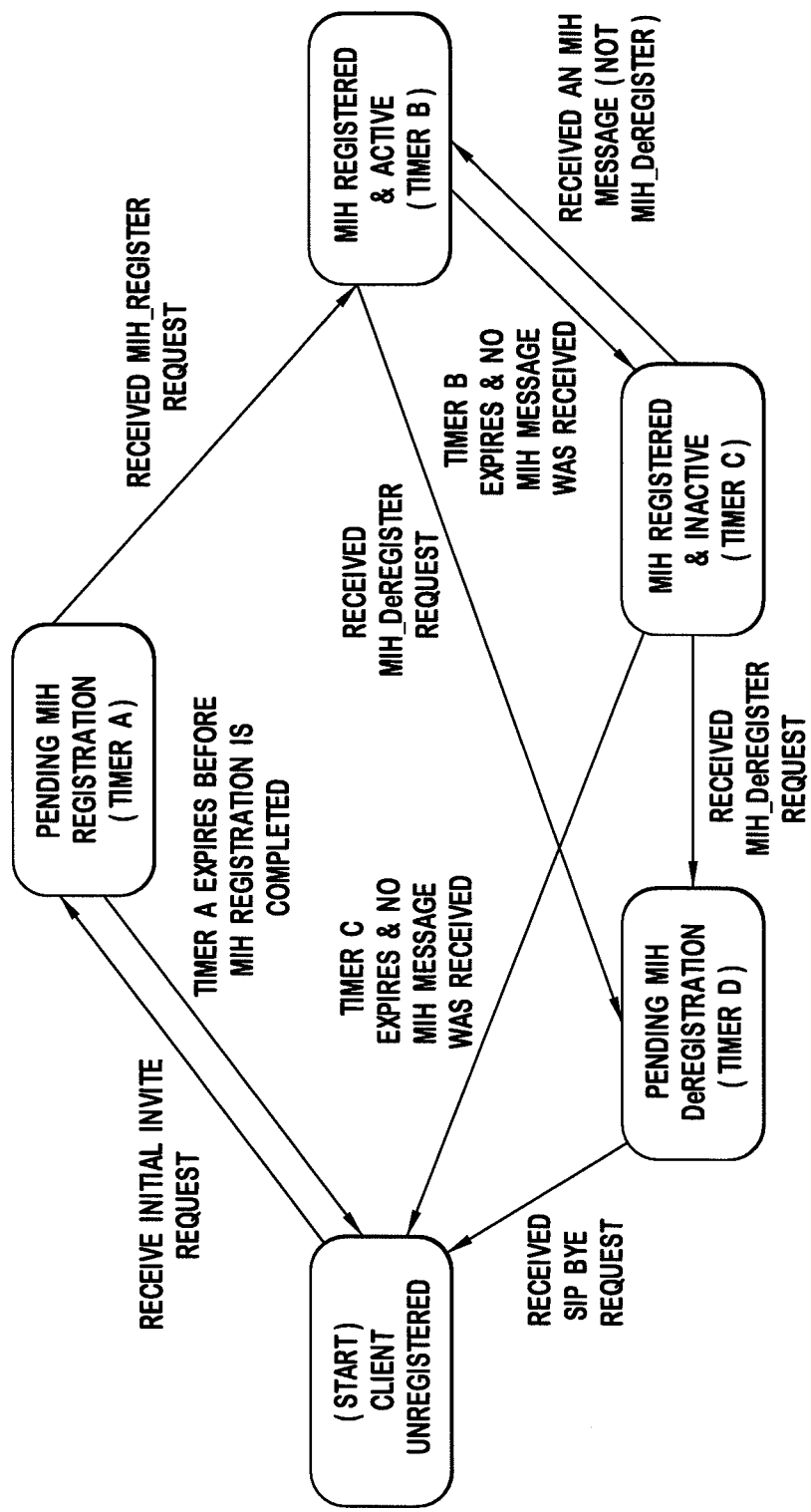
FIG. 9 is registration state changes of the IMS client.

FIG. 9 is registration state changes of the IMS client. In the unregistered state, the client does not have any record at the MIH application server. No timer is associated with the unregistered state.

Upon receipt of an initial INVITE request, the state changes to the pending MIH registration state. In the pending MIH registration state, the IMS client has created a session but has not performed MIH registration. MIH registration is a process of registering for specific negotiated services. The pending MIH registration state is associated with timer A. MIH registration must be completed within a timer A value; otherwise the MIH application server terminates the session, (i.e., unregistered state). If an IMS client's state changes to the unregistered state, all related user information is deleted. If MIH registration is performed with the timer A value, the state changes to the MIH registered and active state.

In the MIH registered and active state, the IMS client has completed MIH registration and communicates with the MIH application server. The registered and active state is associated with timer B. If no communication occurs before timer B expires, a state changes to the MIH registered and inactive state. If an MIH deregister request is received, the state changes to the pending MIH deregistration state.

In the MIH registered and inactive state, the IMS client has completed MIH registration, but has not been in communication with the MIH application server for a specific time period. The MIH registered and inactive state is associated with timer C. The session expires if no communication with the MIH application server occurs before timer C expires, (i.e., the state changes to the unregistered state). If communication other than a deregistration request is received before timer C expires, the state changes to the MIH registered and active state. If a deregistration request is received before timer C expires, the state changes to the pending MIH deregistration state.

In the pending MIH deregistration state, the IMS client has performed MIH deregistration and is about to terminate the session. The pending deregistration state is associated with timer D. An SIP BYE message must be received by the MIH application server within a timer D value; otherwise the MIS application server performs a "manual" session termination, (i.e., remove all records of the IMS client).

Table 1 shows example timer values.

TABLE 1

| Registration state | Associated timer | Example timer value |
| --- | --- | --- |
| Unregistered | None | None |
| Pending MIH registration | Timer A | 10 seconds |
| MIH registered and active | Timer B | 3000 seconds |
| MIH registered and inactive | Timer C | 2000 seconds |
| Pending MIH deregistration | Timer C | 10 seconds |

Although the features and elements are described in particular combinations, each feature or element can be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for use in a wireless transmit/receive unit (WTRU), the method comprising:

the WTRU registering with a Call Session Control Function (CSCF) in an Internet Protocol (IP) Multimedia Subsystem (IMS) via a first wireless network of a first network type;

the WTRU transmitting a first session initiation protocol (SIP) message to an application server in the IMS via the first wireless network, wherein the first SIP message includes a media independent handover (MIH) message; and the WTRU establishing an application session with a second WTRU via the first wireless network;
the WTRU communicating with the second WTRU according to the application session via the first wireless network using a first Internet Protocol (IP) address;
the WTRU performing a handover from the first wireless network to a second wireless network of a second network type;
the WTRU obtaining a second IP address for communicating in the second wireless network;
the WTRU transmitting a second SIP message via the second wireless network for continuing the application session in the second wireless network, wherein the second SIP message indicates the second IP address; and
the WTRU communicating with the second WTRU according to the application session via the second wireless network using the second IP address.

2. The method of claim 1 wherein the first SIP message is a SIP instant message.

3. The method of claim 1 wherein the MIH message is a MIH_CAPABILITY_DISCOVERY.REQUEST message.

4. The method of claim 1 wherein the MIH message is a MIH_REGISTER.REQUEST message.

5. The method of claim 4, further comprising:
receiving a third SIP message from the application server, wherein the third SIP message includes a MIH_REGISTER.CONFIRM message that is responsive to the MIH_REGISTER.REQUEST message.

6. The method of claim 1 wherein the MIH message is a MIH_EVENT_SUBSCRIBE.REQUEST message.

7. The method of claim 1 wherein the first SIP message is a SIP OPTIONS message.

8. A wireless transmit/receive unit (WTRU), the WTRU comprising:
at least one transceiver configured to transmit, via a first wireless network of a first network type, one or more messages to register the WTRU with a Call Session Control Function (CSCF) in an Internet Protocol (IP) Multimedia Subsystem (IMS); and
a processor, configured to generate a first session initiation protocol (SIP) message that includes a media independent handover (MIH) message;
wherein the at least one transceiver is further configured to:
transmit the SIP message to an application server in the IMS via the first wireless network;
establish an application session with a second WTRU via the first wireless network;
communicate with the second WTRU according to the application session via the first wireless network using a first Internet Protocol (IP address);
perform a handover from the first wireless network to a second wireless network of a second network type;
obtain a second IP address for communicating in the second wireless network;
transmit a second SIP message via the second wireless network for continuing the application session in the second wireless network, wherein the second SIP message indicates the second IP address; and
communicate with the second WTRU according to the application session via the second wireless network using the second IP address.

9. The WTRU of claim 8 wherein the first SIP message is a SIP instant message.

10. The WTRU of claim 8 wherein the MIH message is a MIH_CAPABILITY_DISCOVERY.REQUEST message.

11. The WTRU of claim 8 wherein the MIH message is a MIH_REGISTER.REQUEST MESSAGE.

12. The WTRU of claim 11,
wherein the at least one transceiver is configured to receive a third SIP message from the application server, wherein the third SIP message includes a MIH_REGISTER.CONFIRM message that is responsive to the MIH_REGISTER.REQUEST message.

13. The WTRU of claim 8 wherein the MIH message is a MIH_EVENT_SUBSCRIBE.REQUEST message.

14. The WTRU of claim 8 wherein the first SIP message is a SIP OPTIONS message.

15. The method of claim 1, wherein the application session is a Voice over Internet Protocol (VoIP) session, an instant messaging session, or a video streaming session.

16. The method of claim 1, wherein the first network type is wireless local area network (WLAN) and the second network type is cellular.

17. The method of claim 1, wherein the first network type is cellular and wherein the second network type is wireless local area network (WLAN).

18. The method of claim 1, wherein the second SIP message is a SIP REFER message and is transmitted to the application server.

19. The method of claim 1, wherein the second SIP message is a SIP RE-INVITE message and is transmitted to the application server.

20. The method of claim 1, wherein the second SIP message is a SIP RE-INVITE message and is transmitted to the second WTRU.

21. The WTRU of claim 8, wherein the application session is a Voice over Internet Protocol (VoIP) session, an instant messaging session, or a video streaming session.

22. The WTRU of claim 8, wherein the first network type is wireless local area network (WLAN) and the second network type is cellular.

23. The WTRU of claim 8, wherein the first network type is cellular and the second network type is wireless local area network (WLAN).

24. The WTRU of claim 8, wherein the second SIP message is a SIP REFER message and is transmitted to the application server.

25. The WTRU of claim 8, wherein the second SIP message is a SIP RE-INVITE message and is transmitted to the application server.

26. The WTRU of claim 8, wherein the second SIP message is a SIP RE-INVITE message and is transmitted to the second WTRU.

* * * * *